(12) United States Patent  
Jung et al.

(10) Patent No.: US 12,085,775 B2  
(45) Date of Patent: Sep. 10, 2024

(54) LIQUID LENS CONTROL DEVICE

(71) Applicants: LG INNOTEK CO., LTD., Seoul (KR); CORNING INCORPORATED, Corning, NY (US)

(72) Inventors: Sung Ki Jung, Seoul (KR); Young Seop Moon, Seoul (KR)

(73) Assignees: LG INNOTEK CO., LTD., Seoul (KR); CORNING INCORPORATED, Corning, NY (US)

( * ) Notice: Subject to any disclaimer, the term of this patent is extended or adjusted under 35 U.S.C. 154(b) by 315 days.

(21) Appl. No.: 17/626,008

(22) PCT Filed: Jul. 9, 2020

(86) PCT No.: PCT/KR2020/009042  
§ 371 (c)(1),  
(2) Date: Jan. 10, 2022

(87) PCT Pub. No.: WO2021/006673  
PCT Pub. Date: Jan. 14, 2021

(65) Prior Publication Data  
US 2022/0252825 A1    Aug. 11, 2022

(30) Foreign Application Priority Data  
Jul. 9, 2019   (KR) ........................ 10-2019-0082864

(51) Int. Cl.  
*G02B 1/06*       (2006.01)  
*G02B 3/12*       (2006.01)  
(Continued)

(52) U.S. Cl.  
CPC ............... *G02B 7/028* (2013.01); *G02B 3/14* (2013.01); *G02B 7/09* (2013.01); *G02B 26/004* (2013.01); *G03B 3/10* (2013.01)

(58) Field of Classification Search  
CPC . G02B 3/14; G02B 7/028; G02B 7/09; G02B 7/08; G02B 7/008; G02B 7/04;  
(Continued)

(56) References Cited

U.S. PATENT DOCUMENTS 7,408,717 B2    8/2008  Renders et al.  
7,612,947 B2   11/2009  Helwegen et al.  
(Continued)

FOREIGN PATENT DOCUMENTS

GB    2163864 A  *  3/1986  ............... G02B 3/14  
JP    2011-248211 A    12/2011  
(Continued)

OTHER PUBLICATIONS

International Search Report (PCT/ISA/210) issued in PCT/KR2020/009042 mailed on Oct. 27, 2020.

*Primary Examiner* — Mahidere S Sahle  
(74) *Attorney, Agent, or Firm* — Birch, Stewart, Kolasch & Birch, LLP

(57) ABSTRACT

A liquid lens control apparatus according to an embodiment includes: a liquid lens containing a first liquid and a second liquid that form an interface with a first electrode and a second electrode; a lens driver applying a voltage to the first electrode and the second electrode to control the interface, and including a plurality of switching elements; a temperature sensing unit sensing a temperature of the liquid lens; and a control unit controlling the lens driver so that the interface forms a target interface, wherein the control unit controls switching states of the plurality of switching elements of the lens driver to be maintained during a temperature sensing period in which the temperature sensing unit operates.

19 Claims, 23 Drawing Sheets

(51) Int. Cl.
*G02B 3/14* (2006.01)
*G02B 7/02* (2021.01)
*G02B 7/09* (2021.01)
*G02B 26/00* (2006.01)
*G03B 3/10* (2021.01)

(58) Field of Classification Search
CPC .. G02B 26/004; G02B 2207/115; G03B 3/10; G03B 30/00; G03B 2205/0084
USPC .......................................... 359/655, 665–667
See application file for complete search history.

(56) References Cited

U.S. PATENT DOCUMENTS

2005/0041301 A1* 2/2005 Kibayashi ................ G02B 3/14
 359/666
2019/0377236 A1 12/2019 Jang et al.

FOREIGN PATENT DOCUMENTS

| | | | |
|---|---|---|---|
| JP | 2011242542 A | * | 12/2011 |
| KR | 10-2007-0005689 A | | 1/2007 |
| KR | 10-2013-0032459 A | | 4/2013 |
| KR | 10-2017-0025741 A | | 3/2017 |
| KR | 10-2018-0087082 A | | 8/2018 |
| WO | WO 2006/035407 A1 | | 4/2006 |

\* cited by examiner

[FIG. 1]
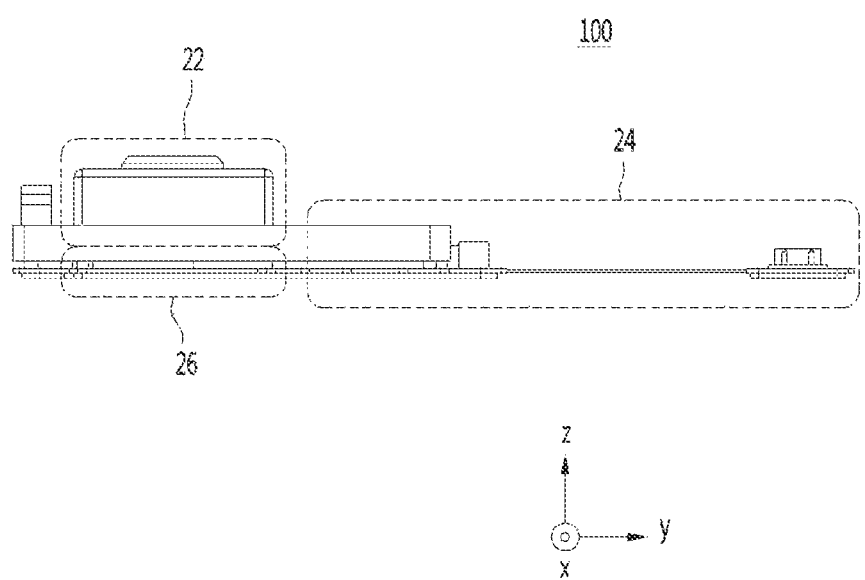

[FIG. 2]
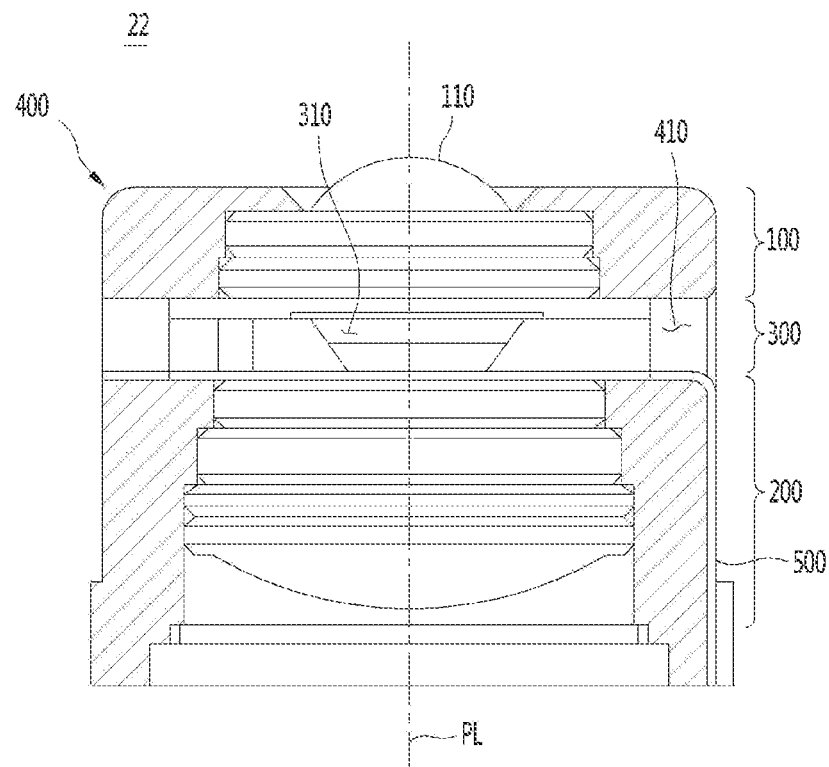

[FIG. 3a]
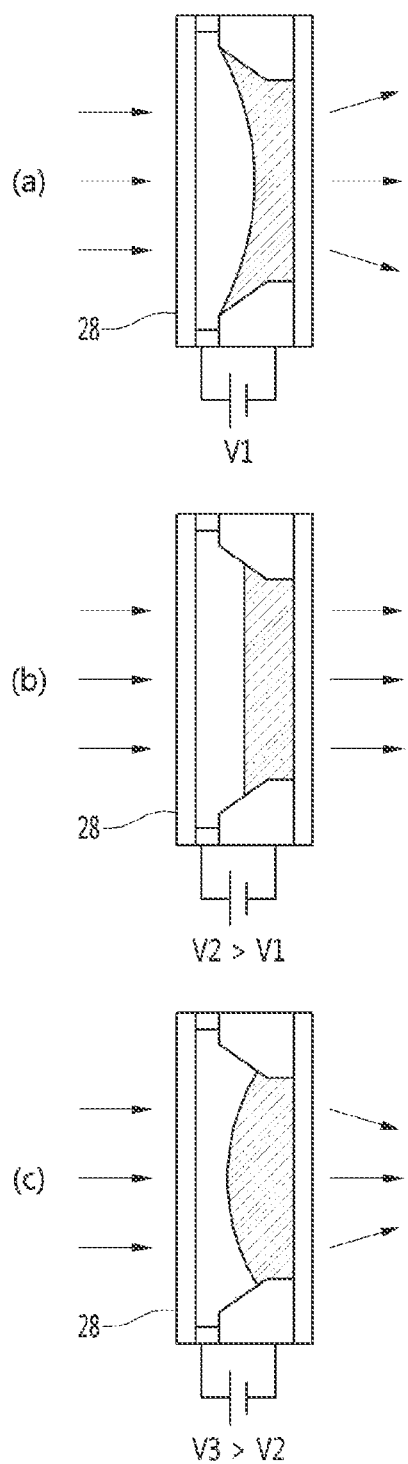

[FIG. 3b]
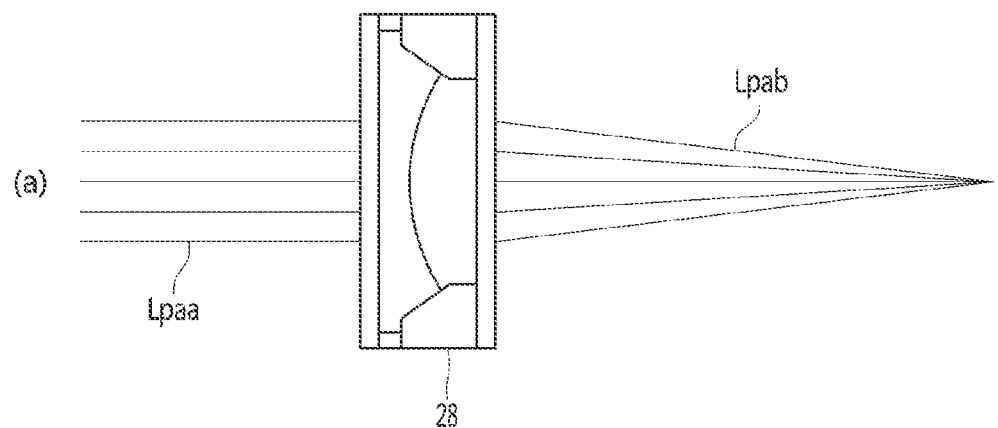
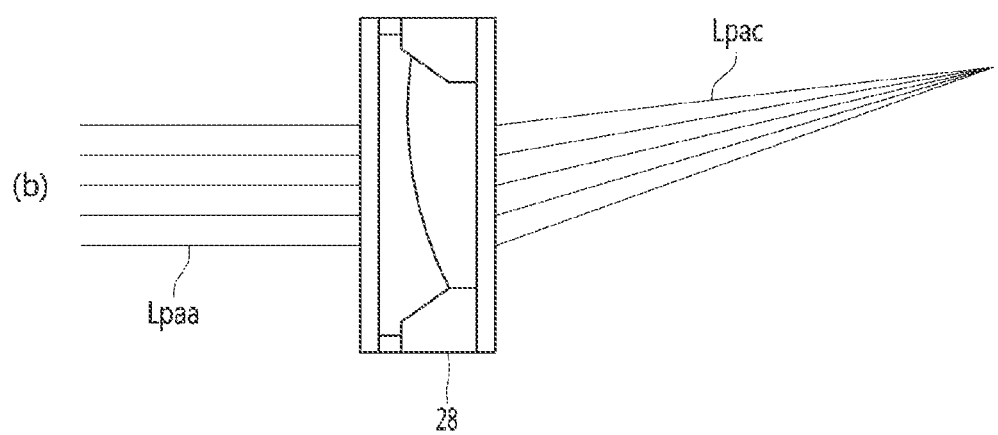

[FIG. 4]
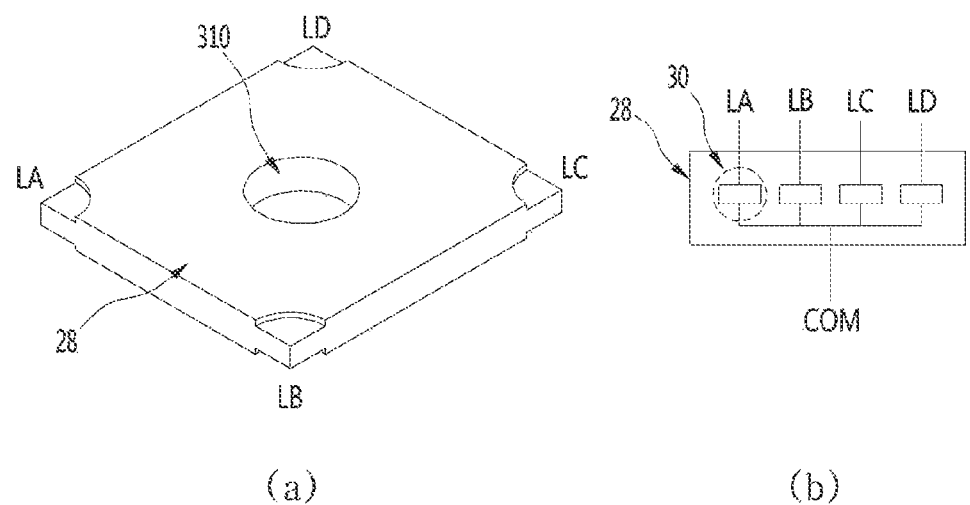
(a)          (b)
[FIG. 5a]
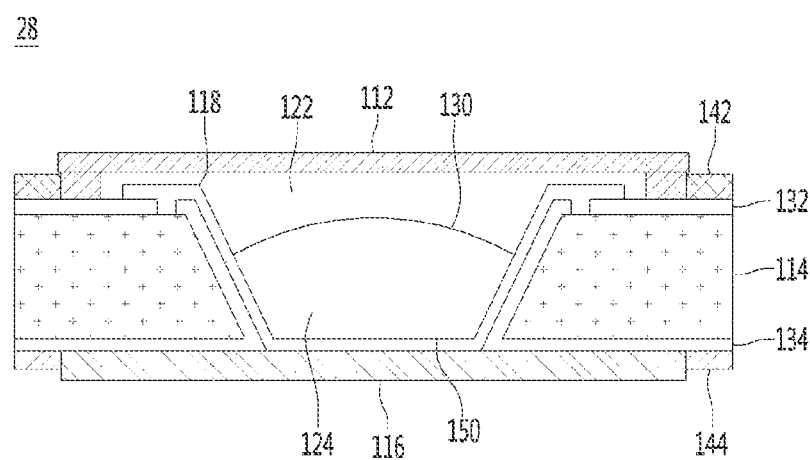

[FIG. 5b]
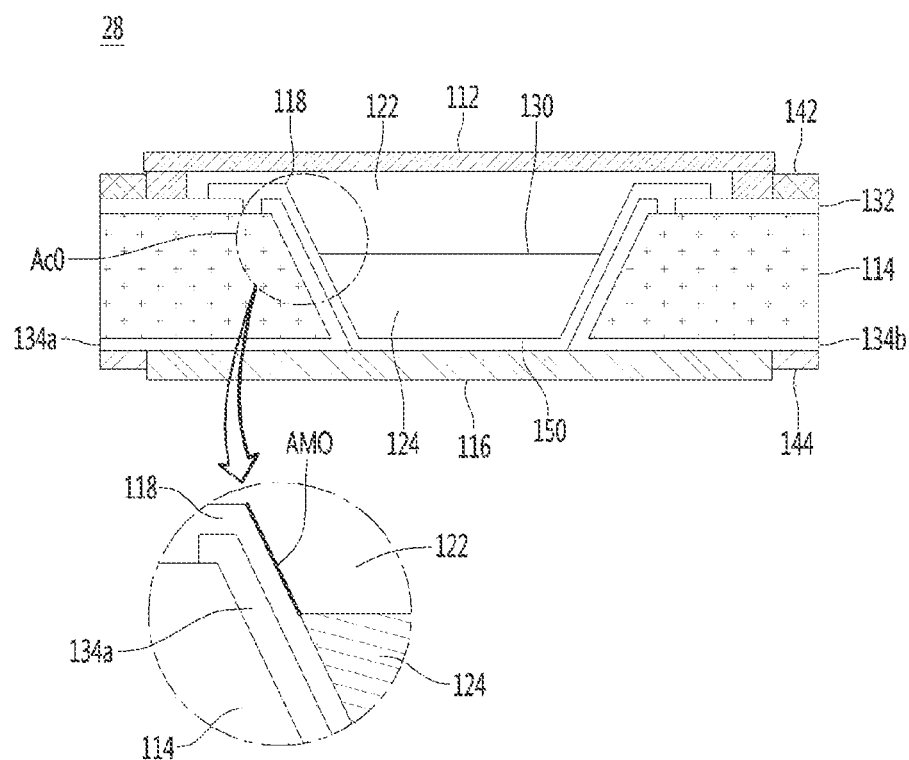

[FIG. 6a]
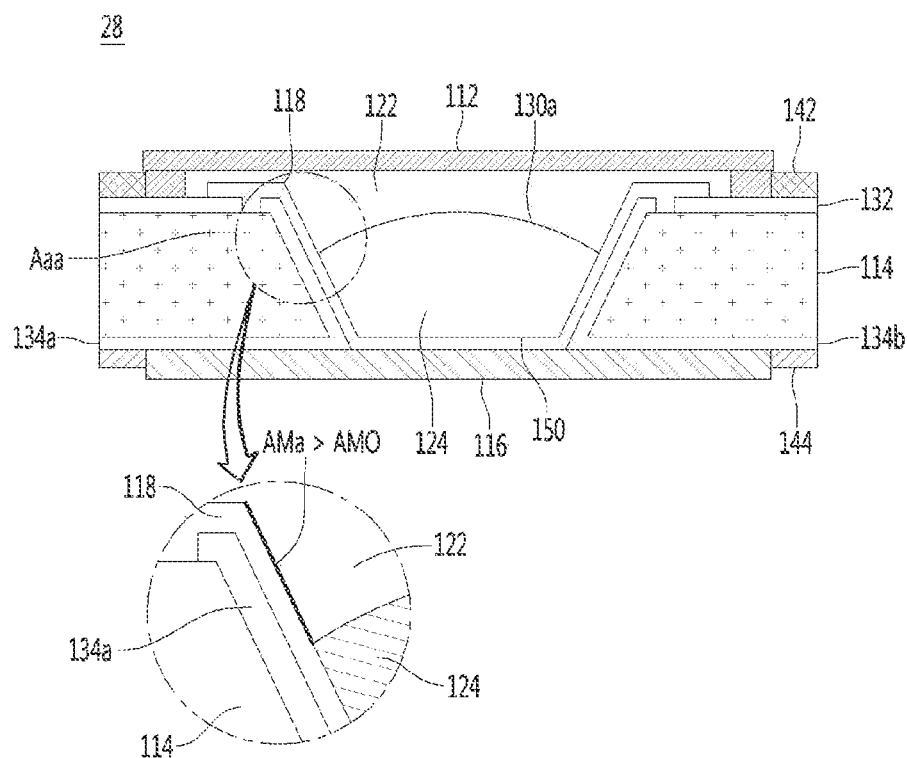

[FIG. 6b]
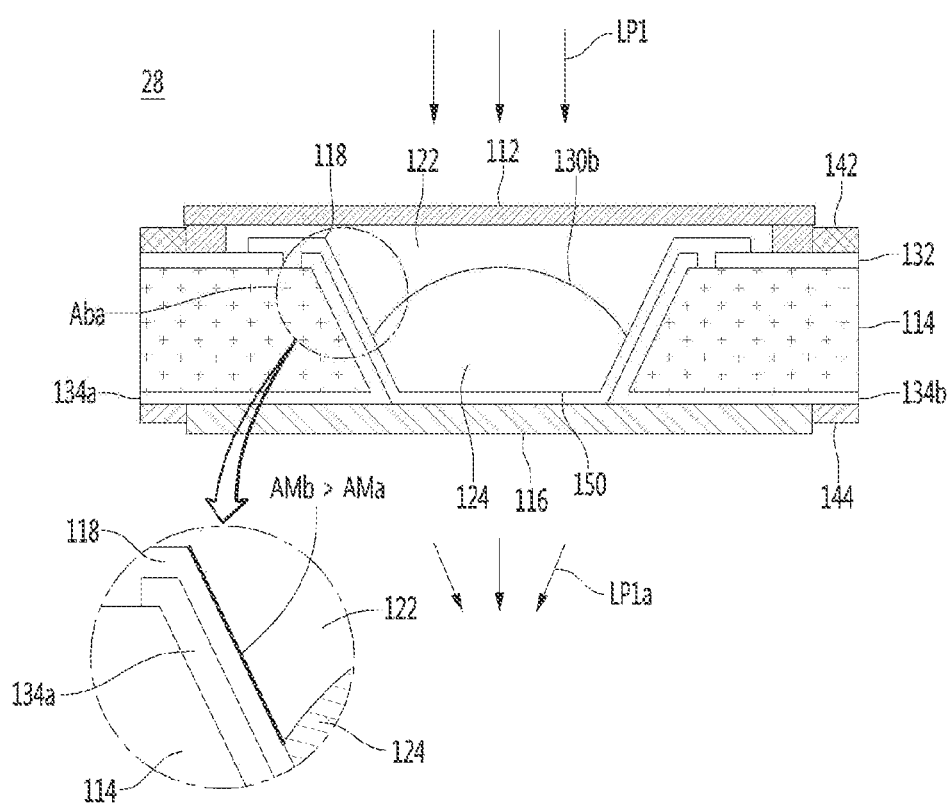

[FIG. 6c]
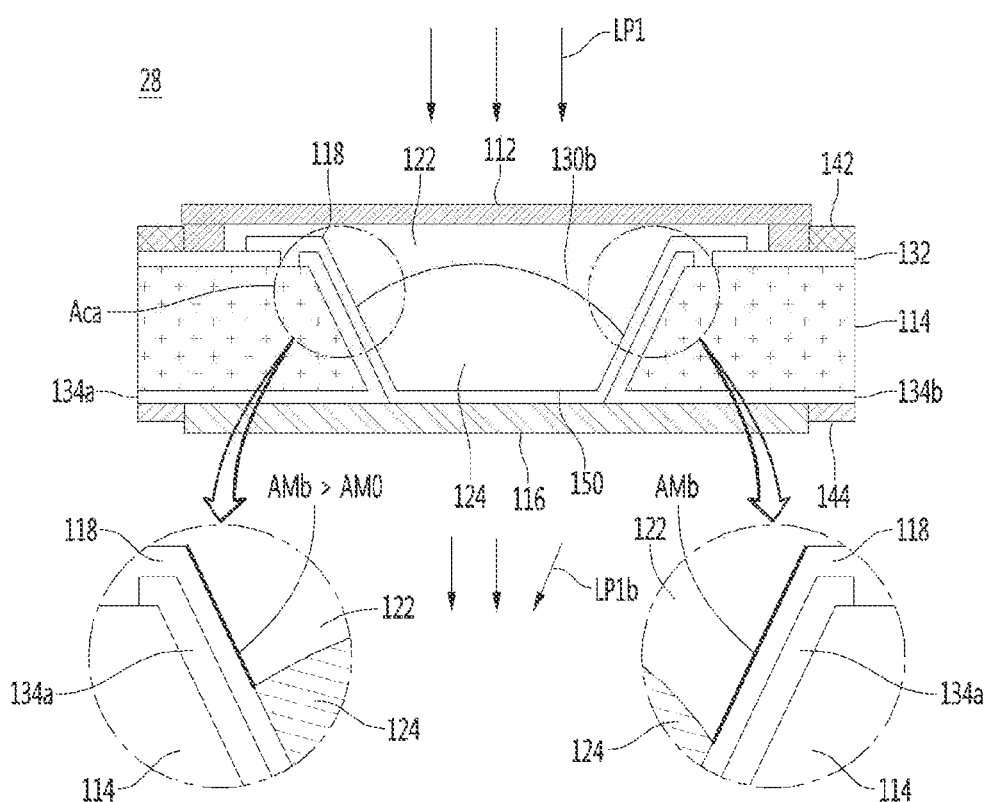

[FIG. 6d]
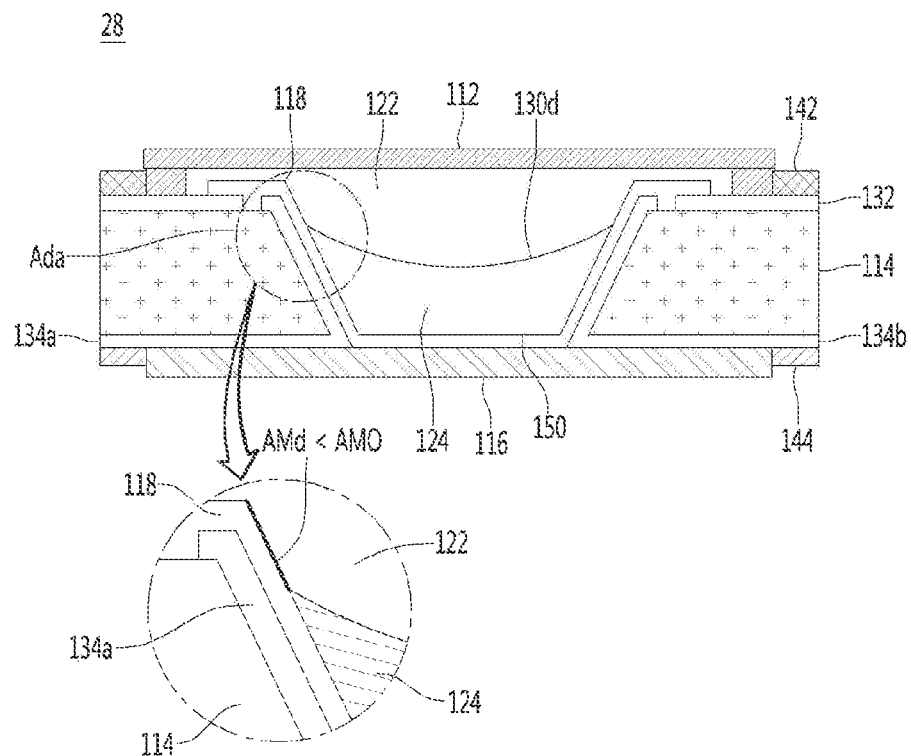

[FIG. 6e]
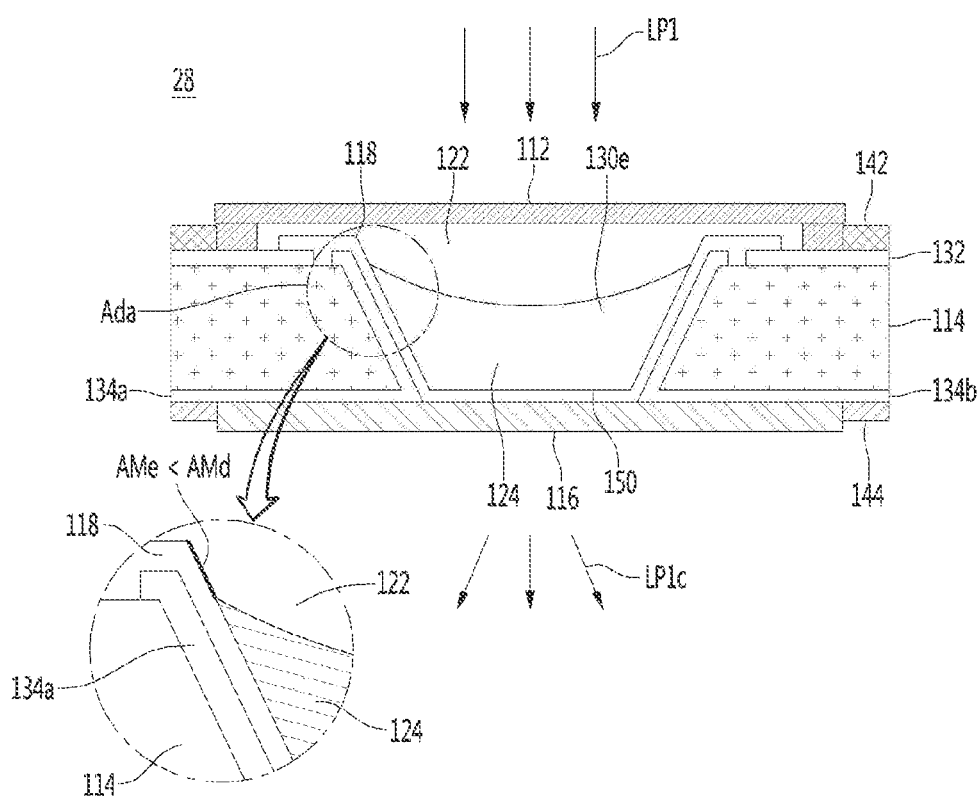

[FIG. 7]
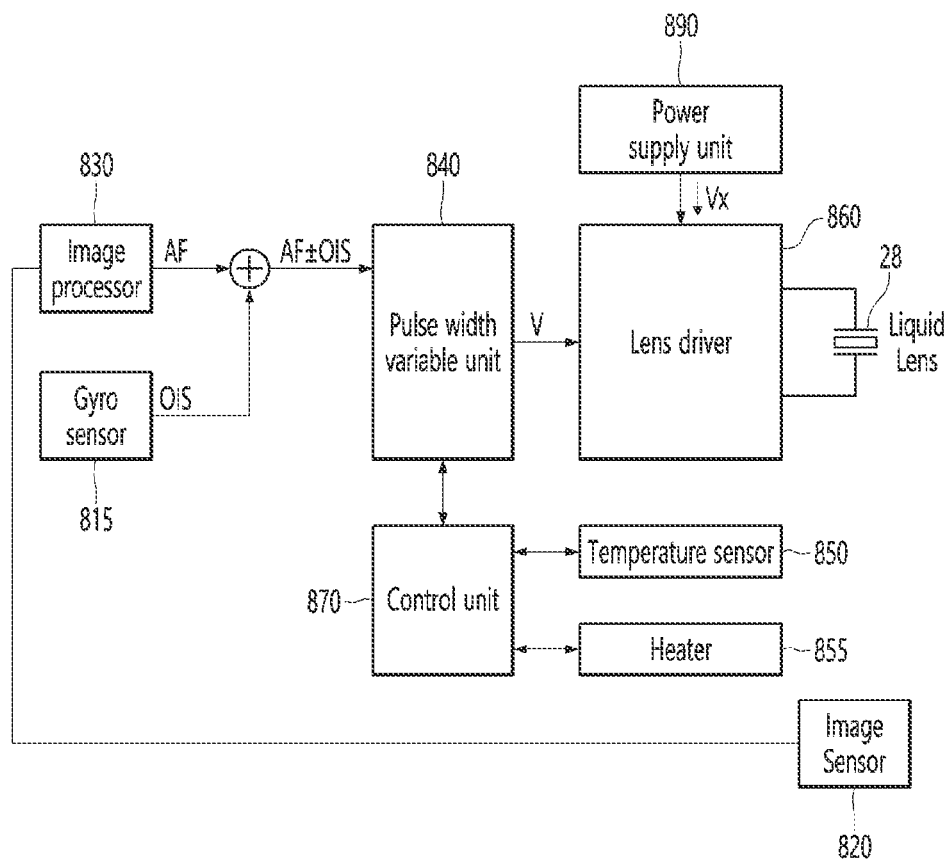

[FIG. 8]
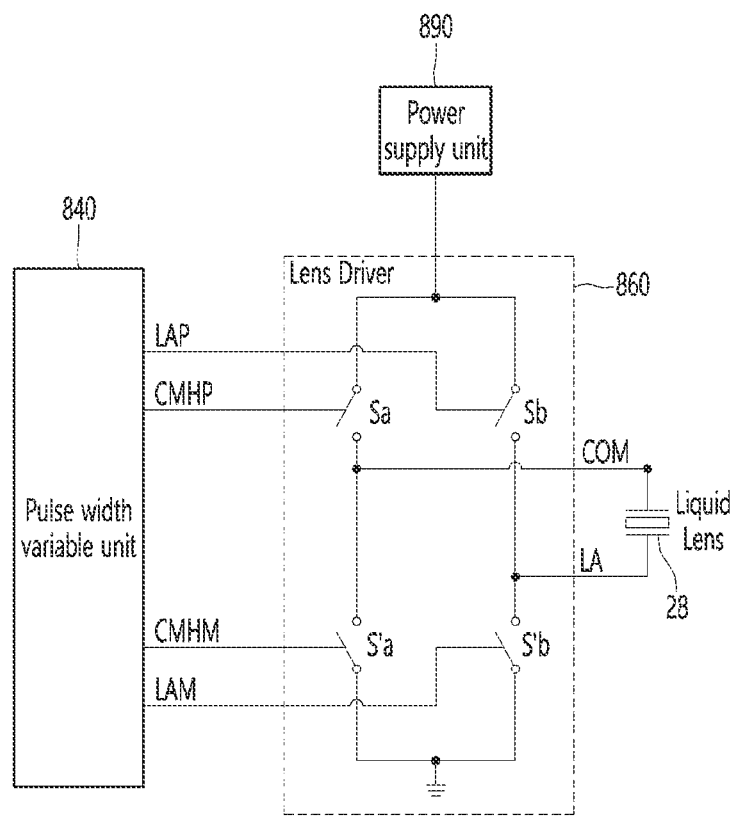
[FIG. 9a]
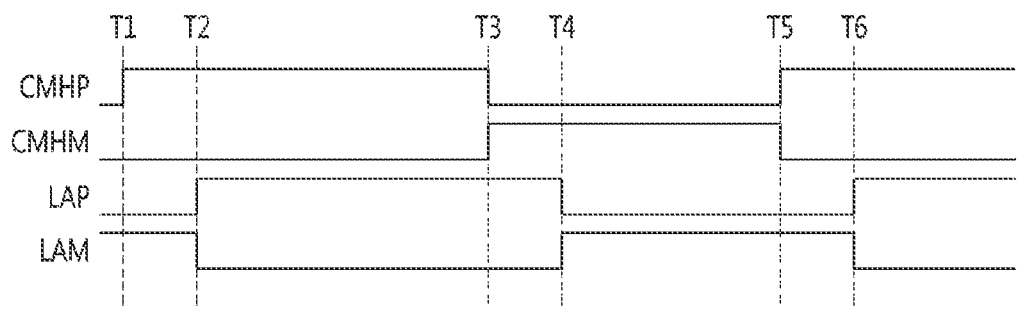

[FIG. 9b]
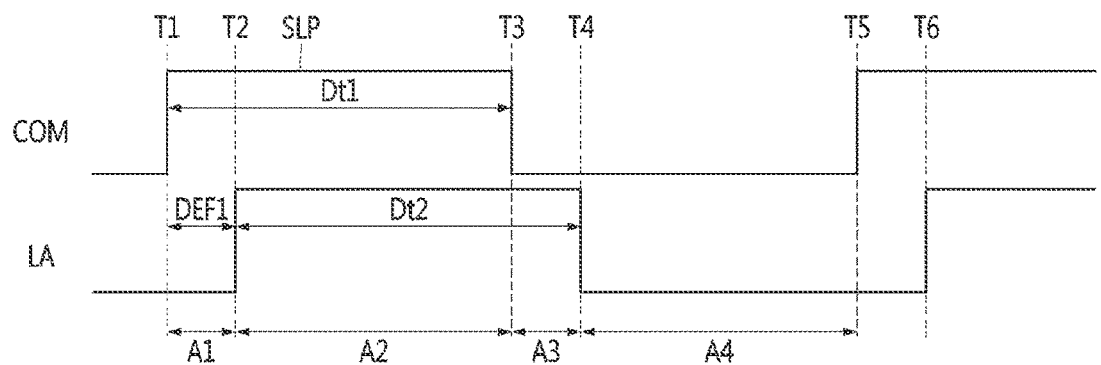
[FIG. 10a]
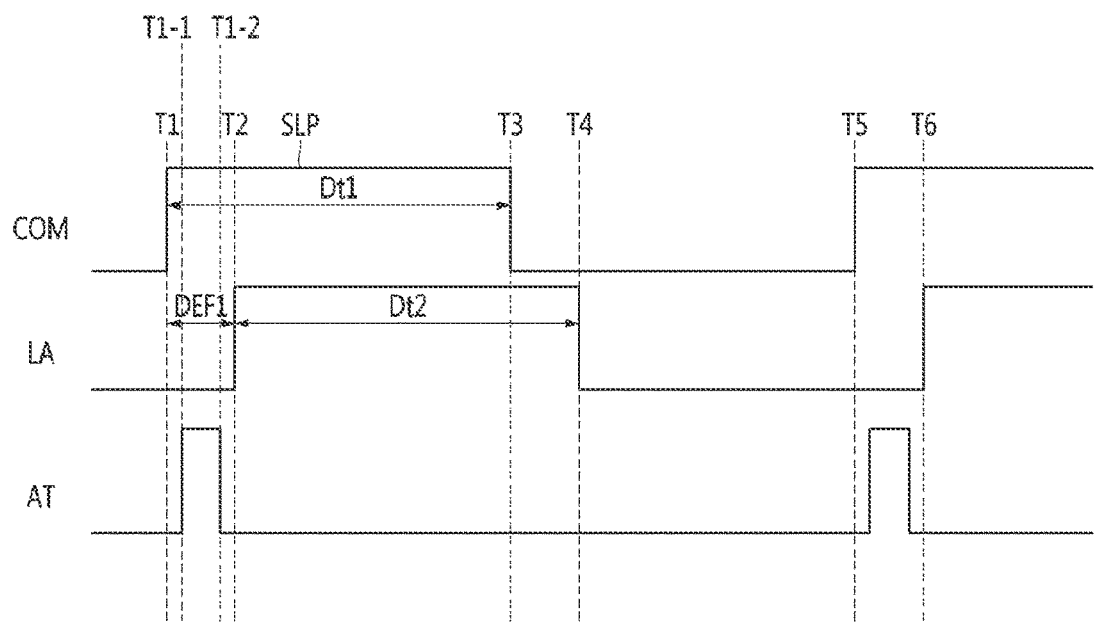

[FIG. 10b]
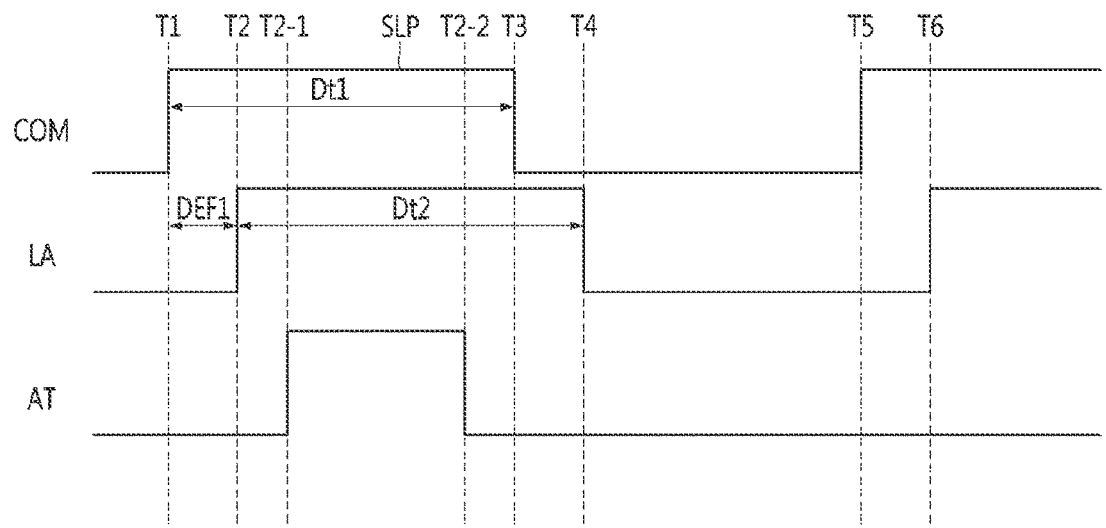
[FIG. 10c]
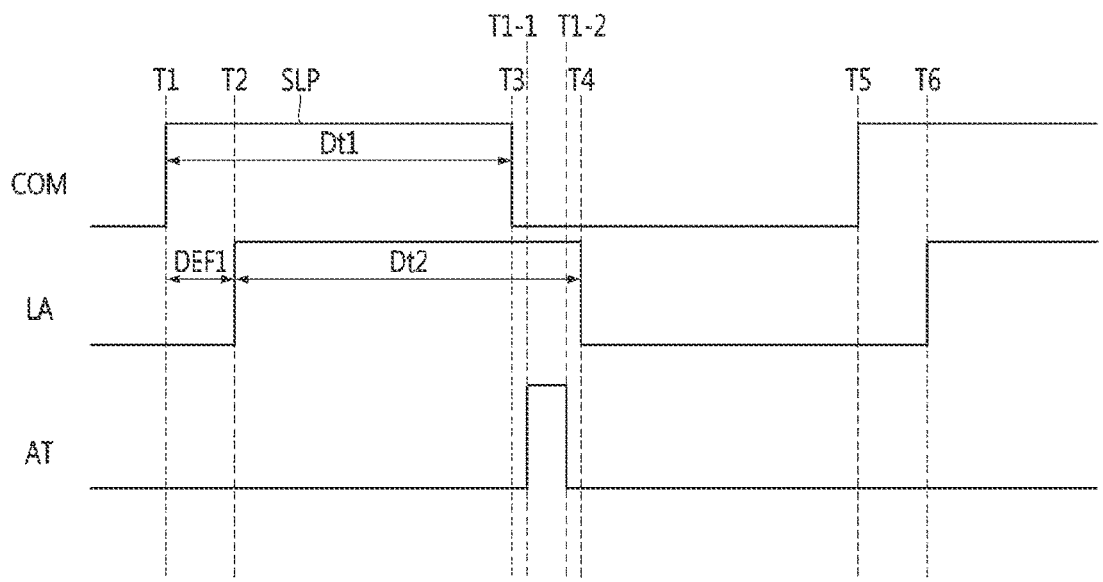

[FIG. 10d]
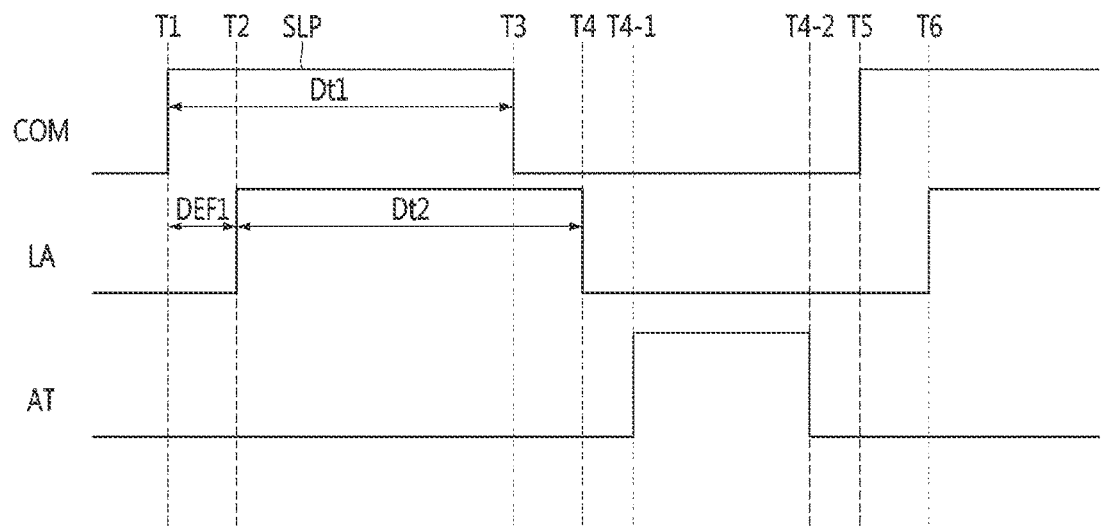
[FIG. 10e]
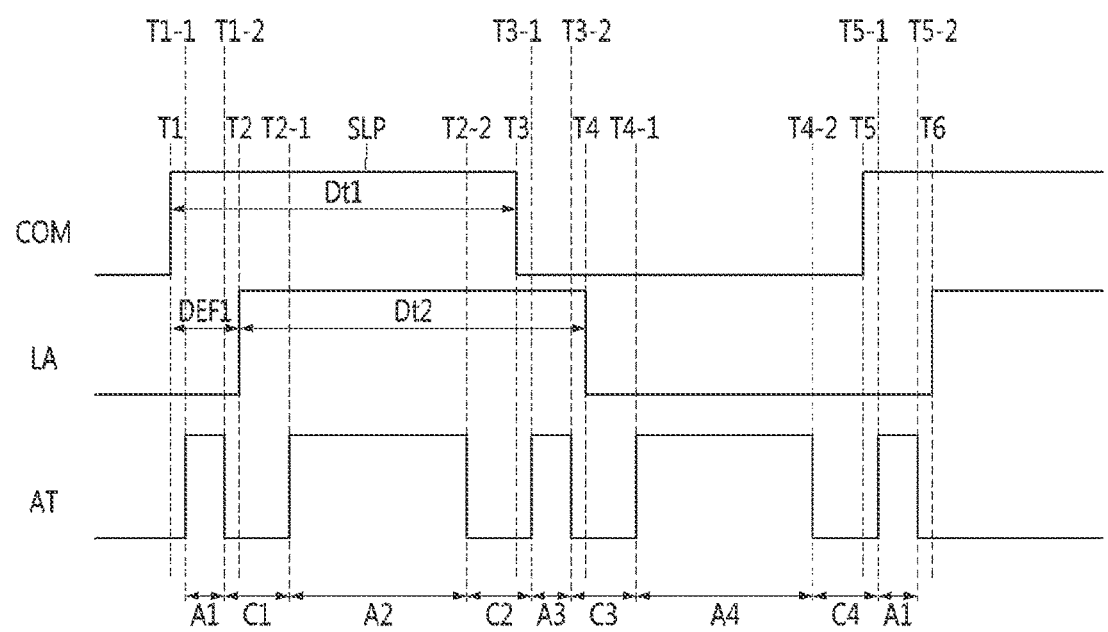

[FIG. 11a]
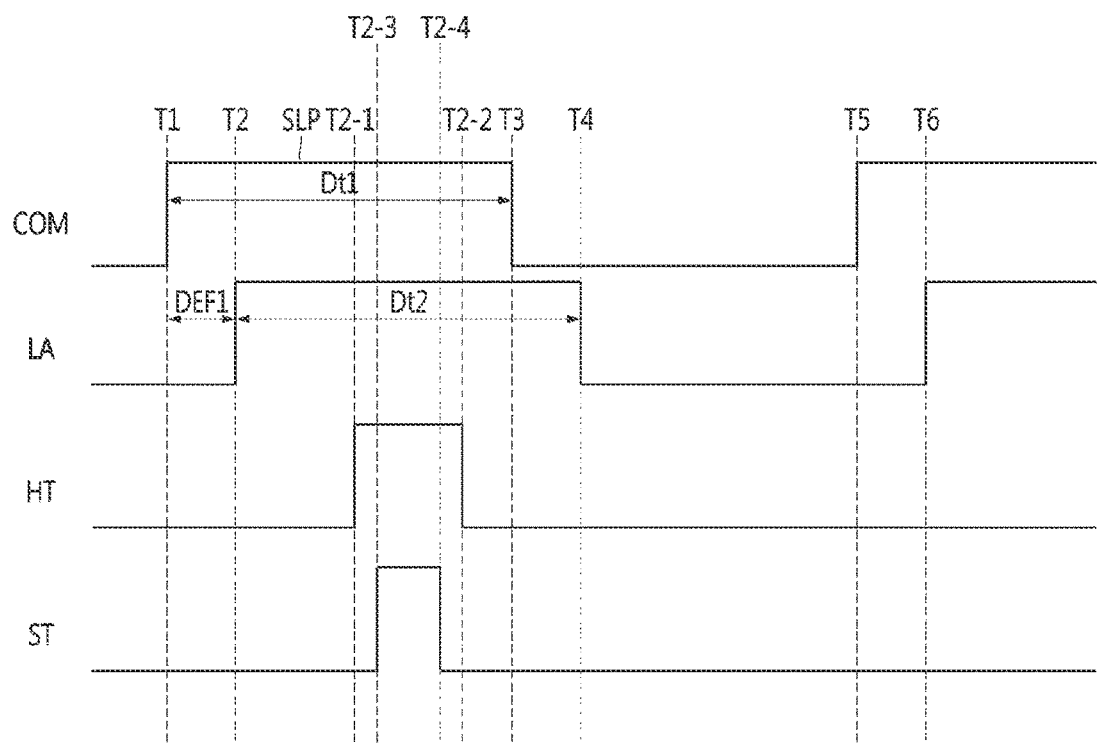

[FIG. 11b]
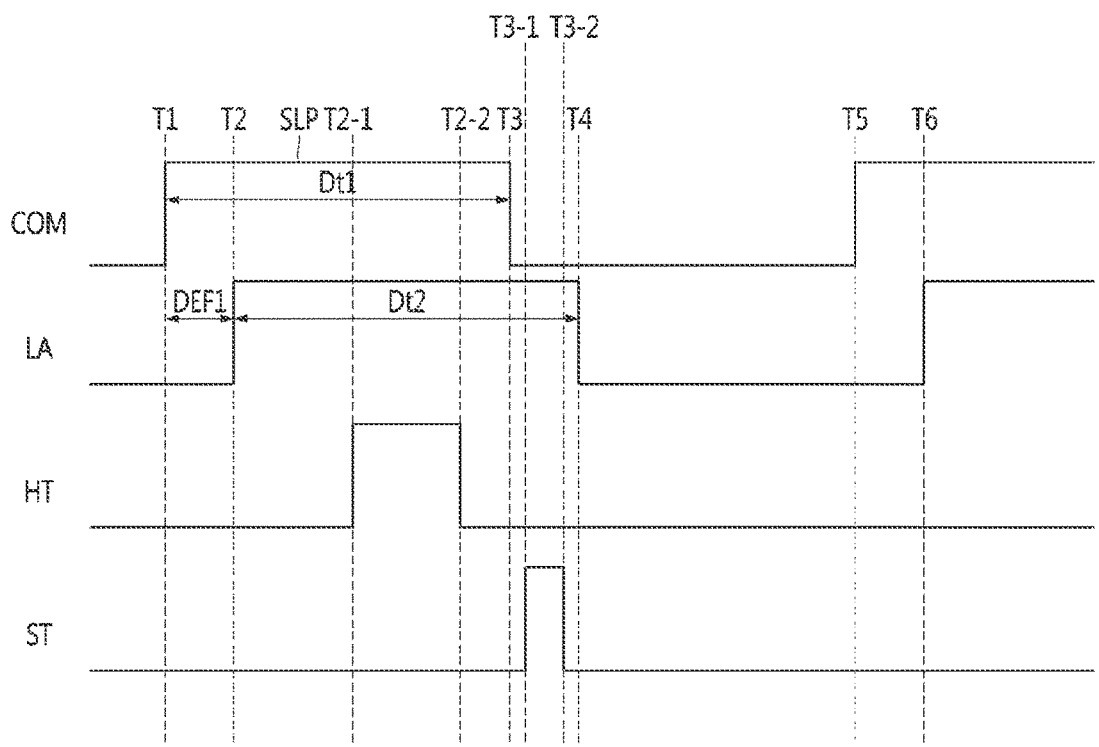

[FIG. 12]
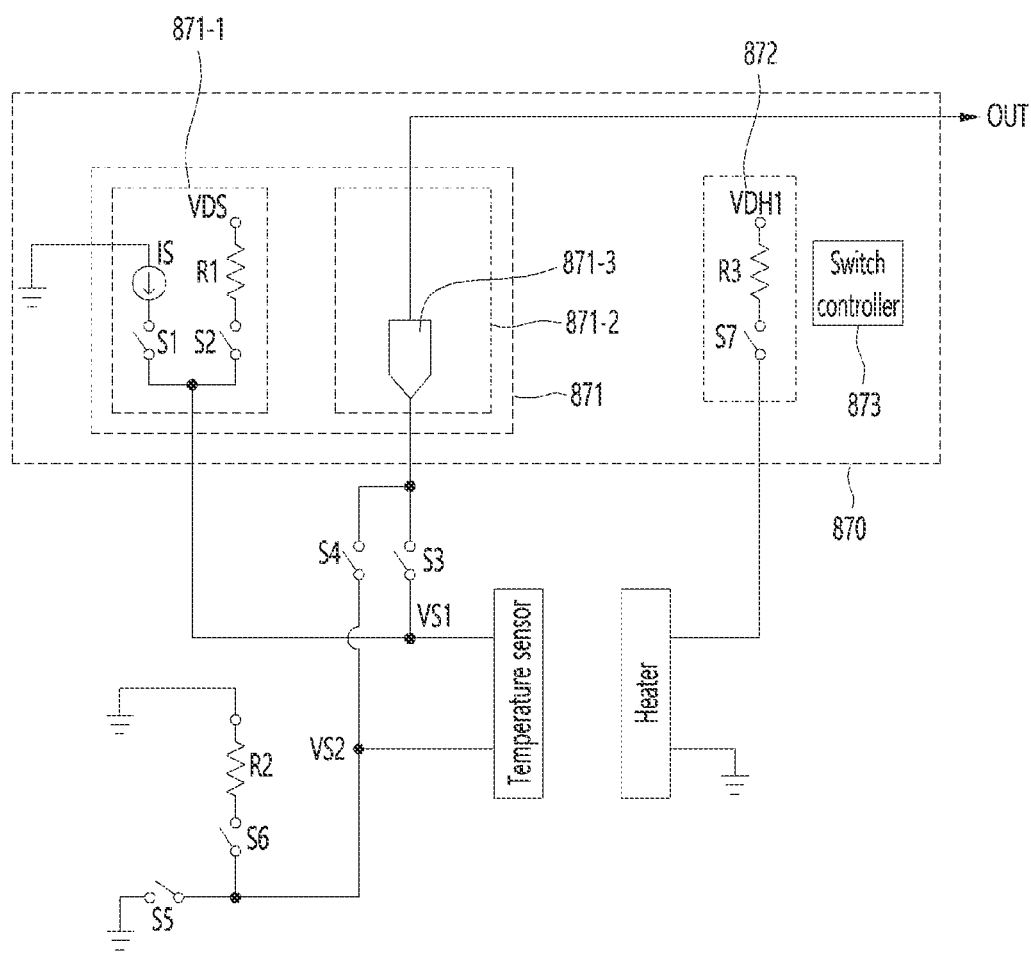

[FIG. 13]
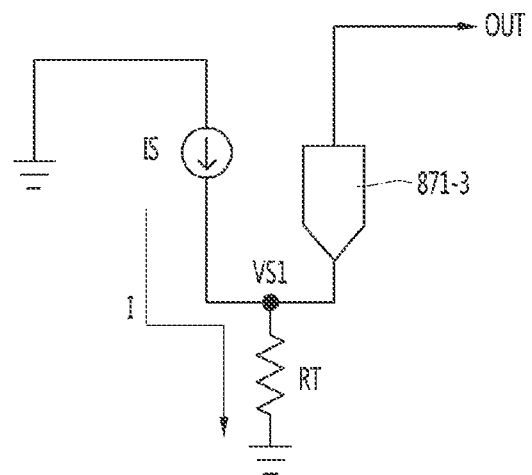
[FIG. 14]
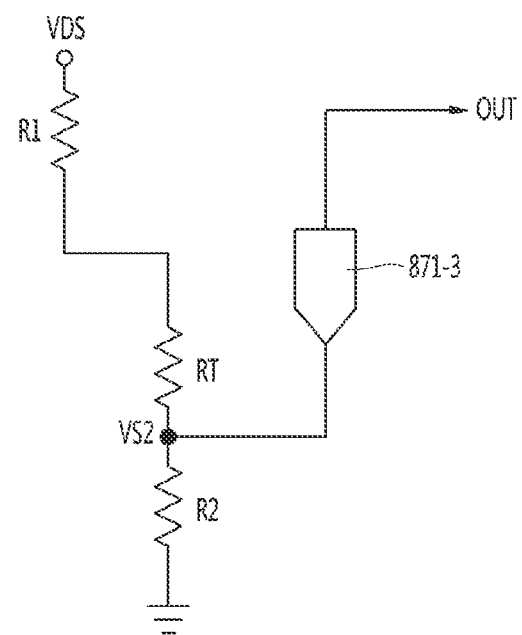

[FIG. 15]
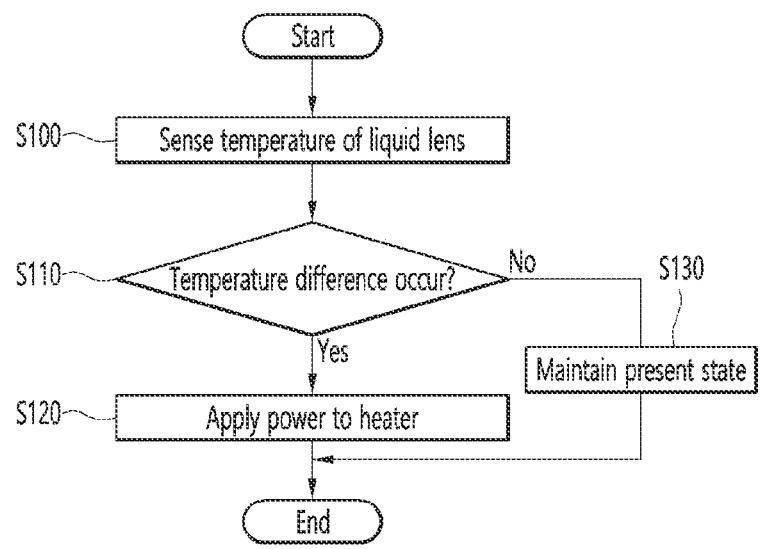

[FIG. 16]
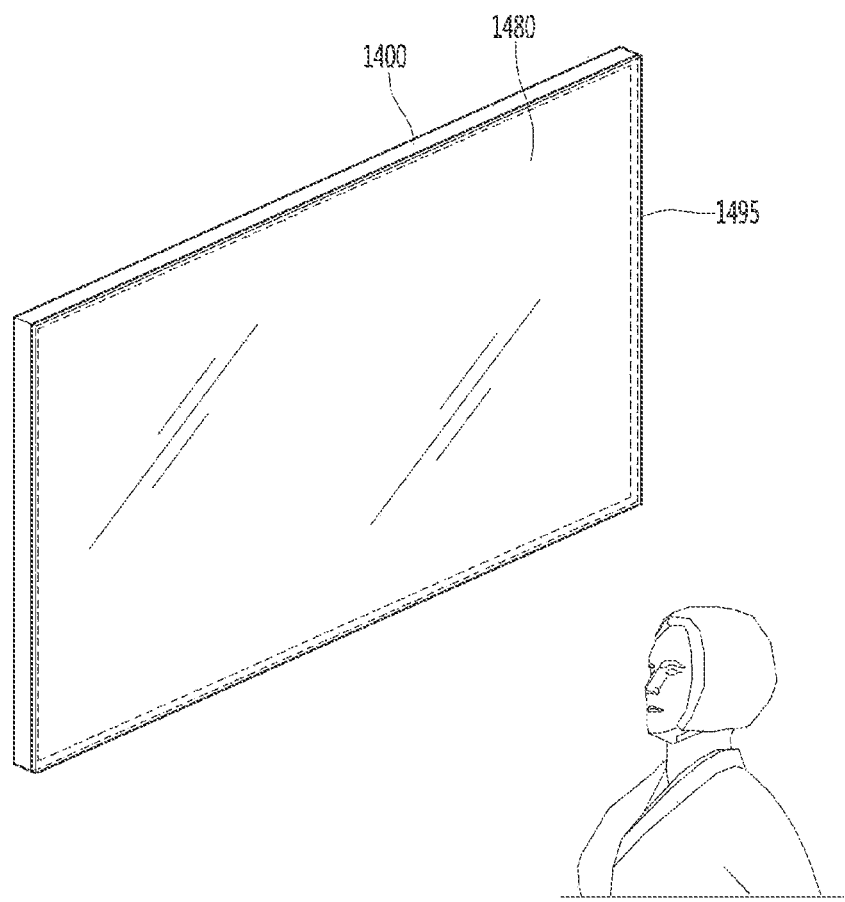

[FIG. 17]
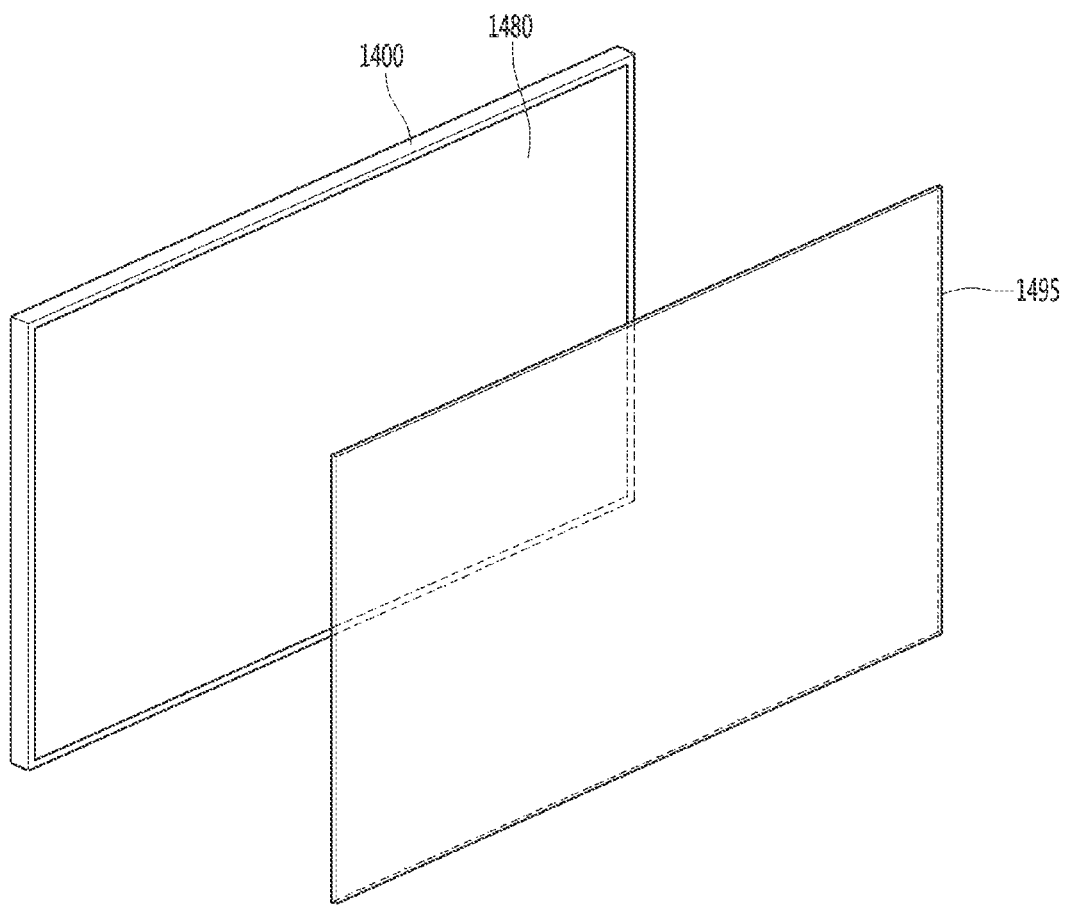

LIQUID LENS CONTROL DEVICE

CROSS REFERENCE TO RELATED APPLICATIONS

This application is the National Phase of PCT International Application No. PCT/KR2020/009042, filed on Jul. 9, 2020, which claims priority under 35 U.S.C. § 119(a) to Patent Application No. 10-2019-0082864, filed in the Republic of Korea on Jul. 9, 2019, respectively, all of which are hereby expressly incorporated by reference into the present application.

TECHNICAL FIELD

An embodiment relates to a camera module, and more particularly to a camera module including a temperature compensation circuit and a control method thereof.

BACKGROUND ART

Users of portable devices desire optical devices having a high resolution, a small size, various photographing functions (e.g., optical zooming function (zoom-in/zoom-out), auto-focusing (AF) function, a camera-shake correction or an optical image stabilizer (OIS) function, or the like). Although such photographing functions may be implemented by combining several lenses and directly moving the lenses, the size of the optical devices may be increased when the number of lenses is increased. The AF and camera-shake correction functions are performed by moving or tilting several lens modules, which are fixed to a lens holder to be aligned with an optical axis, along the optical axis or in a direction perpendicular to the optical axis, and a separate lens-driving device is used to drive the lens modules. However, the lens-driving device has high power consumption, and a cover glass should be separately added to a camera module in order to protect the lens-driving device, and thus the overall thickness of the lens-driving device is increased. Therefore, research has been conducted on a liquid lens that electrically adjusts a curvature of an interface between two types of liquids to perform the AF and camera-shake correction functions.

DISCLOSURE

Technical Problem

An embodiment is to provide a liquid lens control circuit, a camera module, and a liquid lens control method that prevent a switching operation of a lens driver from being performed in a period in which a temperature compensation circuit of a liquid lens operates so as to solve a temperature compensation error caused by the switching operation of the lens driver.

In addition, the embodiment is to provide a liquid lens control circuit, a camera module, and a liquid lens control method that prevent a temperature sensing operation in a period in which an operation state of a heater is changed so as to solve a temperature sensing error caused by a change of the operation state of the heater.

In addition, the embodiment is to provide a liquid lens control circuit, a camera module, and a liquid lens control method that synchronize a heater driving timing and a temperature sensing timing with a timing avoiding a switching time of a lens driver so as to minimize influence of a noise caused by switching of the lens driver.

Technical problems to be solved in the present invention are not limited to the above-mentioned technical problems, and other technical problems not mentioned will be clearly understood by a person having an ordinary skill in the art to which the present invention pertains, from following descriptions.

Technical Solution

A liquid lens control apparatus according to an embodiment includes: a liquid lens containing a first liquid and a second liquid that form an interface with a first electrode and a second electrode; a lens driver applying a voltage to the first electrode and the second electrode to control the interface, and including a plurality of switching elements; a temperature sensing unit sensing a temperature of the liquid lens; and a control unit controlling the lens driver so that the interface forms a target interface, wherein the control unit controls switching states of the plurality of switching elements of the lens driver to be maintained during a temperature sensing period in which the temperature sensing unit operates.

In addition, a liquid lens control apparatus according to an embodiment includes: a liquid lens containing a first liquid and a second liquid that form an interface with a common electrode and a plurality of individual electrodes; a lens driver applying a voltage to the common electrode and the plurality of individual electrodes to control the interface; a temperature sensing unit sensing a temperature of the liquid lens; and a control unit controlling the lens driver so that the interface forms a target interface, wherein the temperature sensing unit senses the temperature of the liquid lens in a region in which potentials of voltages applied to the common electrode and the plurality of individual electrodes are not changed.

In addition, the temperature sensor senses the temperature of the liquid lens in a period between a first rising-edge time at which the voltage applied to the common electrode rises from a low potential to a high potential and a second rising-edge time at which the voltage applied to the plurality of individual electrodes rises from a low potential to a high potential.

In addition, the temperature sensor senses the temperature of the liquid lens in a period between a first falling-edge time at which the voltage applied to the common electrode drops from a high potential to a low potential and a second falling-edge time at which the voltage applied to the plurality of individual electrodes drops from a high potential to a low potential.

In addition, a liquid lens control apparatus according to an embodiment includes: a liquid lens containing a first liquid and a second liquid that form an interface with a first electrode and a second electrode; a lens driver applying a voltage to the first electrode and the second electrode to control the interface, and including a plurality of switching elements; a temperature compensation unit compensating a temperature of the liquid lens; and a control unit controlling the lens driver so that the interface forms a target interface, and controlling the temperature compensation unit so that the liquid lens has a target temperature, wherein the control unit controls switching states of the plurality of switching elements constituting the lens driver to be maintained during a temperature compensation time at which the temperature compensation unit operates.

In addition, a liquid lens control apparatus according to an embodiment includes: a liquid lens including a first electrode and a second electrode; a lens driver applying a voltage to the first electrode and the second electrode to control an interface of the liquid lens, and including a plurality of switching elements; a temperature compensation unit compensating a temperature of the liquid lens; and a control unit controlling the lens driver so that the liquid lens forms a target curvature, and controlling the temperature compensation unit so that the liquid lens has a target temperature, wherein the control unit determines a period in which switching states of the plurality of switching elements are maintained as a temperature compensation time at which the temperature compensation unit operates, and controls the temperature compensation unit to operate during the temperature compensation time.

In addition, the first electrode includes a common electrode, and the second electrode includes a plurality of individual electrodes.

In addition, the temperature compensation time includes a first period between a first rising-edge time at which a voltage applied to the common electrode rises from a ground voltage to a driving voltage and a second rising-edge time at which a voltage applied to the plurality of individual electrodes rises from the ground voltage to the driving voltage.

In addition, the second rising-edge time is a rising-edge time of an individual electrode to which a driving voltage having a smallest time difference as compared with the driving voltage applied to the common electrode is applied among the plurality of individual electrodes.

In addition, the temperature compensation time includes a second period between a second rising-edge time at which the voltage applied to the plurality of individual electrodes rises from the ground voltage to the driving voltage and a first falling-edge time at which the voltage applied to the common electrode drops from the driving voltage to the ground voltage.

In addition, the second rising-edge time is a rising-edge time of an individual electrode to which a driving voltage having a largest time difference as compared with the driving voltage applied to the common electrode is applied among the plurality of individual electrodes.

In addition, the temperature compensation time includes a third period between a first falling-edge time at which the voltage applied to the common electrode drops from the driving voltage to the ground voltage and a second falling-edge time at which the voltage applied to the plurality of individual electrodes drops from the driving voltage to the ground voltage.

In addition, the second falling-edge time is a falling-edge time of an individual electrode to which a driving voltage having a smallest time difference as compared with the driving voltage applied to the common electrode is applied among the plurality of individual electrodes.

In addition, the temperature compensation time includes a fourth period between a second falling-edge time at which the voltage applied to the plurality of individual electrodes rises from the driving voltage to the ground voltage and a third rising-edge time at which the voltage applied to the common electrode rises from the ground voltage to the driving voltage.

In addition, the second falling-edge time is a falling-edge time of an individual electrode to which a driving voltage having a largest time difference as compared with the driving voltage applied to the common electrode is applied among the plurality of individual electrodes.

In addition, the temperature compensation unit includes a temperature sensor for sensing a temperature of the liquid lens; and at least one of heaters operating based on the sensed temperature, and the temperature compensation time includes at least one of a sensing time at which the temperature sensor is operated and a heating time at which the heater is operated.

In addition, the sensing time and the heating time are overlapped with each other.

Further, the sensing time and the heating time are periods in which the switching states of the plurality of switching elements that are not overlapped with each other are maintained.

Furthermore, the heating time includes an ON change period in which the operation state of the heater is changed to an ON state, an OFF change period in which the operation state of the heater is changed to an OFF state, and a heating period between the ON change period and the OFF change period, and the sensing time is not overlapped with the ON change period and the OFF change period.

In addition, a liquid lens control method according to an embodiment includes: sensing a temperature of a liquid lens; detecting a difference between the sensed temperature and a set target temperature of the liquid lens; and operating a heater by applying power to the heater when there is a difference between the sensed temperature and the target temperature, wherein the sensing of the temperature of the liquid lens and the operating of the heater are performed during a preset temperature compensation time, and the temperature compensation time is a period in which a switching state of a switching element of a lens driver that controls an interface of the liquid lens is maintained.

In addition, the operating of the heater includes: turning on the heater by applying the power to the heater; and turning off the heater by shutting off the power applied to the heater, and the sensing of the temperature of the liquid lens is performed in remaining periods except a period in which the heater is turned on and a period in which the heater is turned off from the temperature compensation time.

In addition, a liquid lens control method according to an embodiment includes: sensing a temperature of a liquid lens; and controlling a driving voltage of the liquid lens based on the sensed temperature, wherein the sensing of the temperature is performed in a period in which a potential of the driving voltage of the liquid lens is not changed.

Advantageous Effects

In an embodiment, a temperature of a liquid lens is sensed in a period in which a switching element of a lens driver that changes a curvature of an interface of the liquid lens is not switched. Accordingly, it is possible to minimize the influence of noise generated by a switching operation of the switching element in a temperature sensing operation, thereby improving accuracy of the temperature sensing.

In addition, in the embodiment, the temperature of the liquid lens is sensed in the period in which the operating state of the heater is not changed. Accordingly, it is possible to minimize the influence of noise generated by changing the operating state of the heater during the temperature sensing operation, thereby improving accuracy of the temperature sensing.

Further, in the embodiment, the switching period of the lens driver used for driving the liquid lens is avoided to operate the heater, and the period in which the operation state of the heater is changed is avoided to perform the temperature sensing operation, thereby improving accuracy of the temperature compensation algorithm.

DESCRIPTION OF DRAWINGS

FIG. 1 shows an example of a camera device.

FIG. 2 shows an example of a lens assembly included in the camera device.

FIGS. 3A and 3B are views for describing a driving method of a liquid lens.

FIG. 4 shows a liquid lens of which focal length is adjusted according to a driving voltage.

FIGS. 5A and 5B show a structure of a liquid lens.

FIGS. 6A to 6E are views illustrating various curvatures of a liquid lens.

FIG. 7 is an example of an internal block diagram of a camera module according to an embodiment.

FIG. 8 is an example of an internal circuit diagram of a lens driver in FIG. 7.

FIG. 9A is an example of a waveform diagram for describing an operation of the lens driver of FIG. 8.

FIG. 9B is a view referred to for describing a driving voltage supplied to a liquid lens of FIG. 8.

FIGS. 10A to 10E are diagrams referred to for describing an operation timing of a temperature compensation algorithm according to an embodiment.

FIGS. 11A and 11B are diagrams referred to for describing a temperature sensing timing and a heater driving timing according to an embodiment.

FIG. 12 is a diagram for describing an operation of a temperature compensation algorithm according to an embodiment.

FIG. 13 shows an equivalent circuit when a driving signal is supplied in a current form.

FIG. 14 shows an equivalent circuit when a driving signal is supplied in a voltage form.

FIG. 15 is a flow chart for describing a control method of a camera module according to an embodiment.

FIG. 16 is a view showing an external appearance of a video display device according to one embodiment of the present invention.

FIG. 17 is a view showing an optical unit and a display of the video display device of FIG. 16 separately.

DETAILED DESCRIPTION OF THE EMBODIMENTS

Hereinafter, embodiments will be described in detail with reference to the accompanying drawings. While the embodiments may have various modifications and may have various forms, specific embodiments are illustrated in the drawings and described in detail in the specification. However, there is no intent to limit the embodiment to the particular forms disclosed, and it should be understood as including all modifications, equivalents and alternatives that fall within the spirit and scope of the embodiment.

Although the terms "first," "second," etc. may be used to describe various elements, these elements should not be limited by these terms. These terms are only used to distinguish one element from another. In addition, terms defined specially in consideration of a configuration and operation of the embodiment are only for describing the embodiment, and do not limit the scope of the embodiment.

In describing the embodiments, when elements are described with terms "above (up) or below (down)", "front (head) or back (rear)", the terms "above (up) or below (down)", "front (head) or back (rear)" may include both meanings that two elements are in direct contact with each other, or one or more other components are disposed between the two elements to form. Further, when expressed as "on (over)" or "under (below)", it may include not only the upper direction but also the lower direction based on one element.

In addition, relational terms such as "on/above" and "under/below" used below do not necessarily require or imply any physical or logical relationship or order between such entities or elements, and may be used to distinguish any entity or element from another entity or element.

FIG. 1 shows an example of a camera device. As shown in the drawing, a camera module may include a lens assembly 22 and an image sensor. At least one solid lens may be disposed on an upper portion or a lower portion of the lens assembly 22. The lens assembly 22 may include a liquid lens of which focal length is adjusted according to a voltage applied thereto. The camera module may include the lens assembly 22 including a first lens of which focal length is adjusted according to a driving voltage applied between a common terminal and a plurality of individual terminals, a control circuit 24 for supplying a driving voltage to the first lens, and an image sensor 26 that is aligned with the lens assembly 22, converts light transferred through the lens assembly 22 into electrical signals, and is disposed at the lower portion of the lens assembly 22.

Referring to FIG. 1, the camera module may include the circuit 24, 26, and the lens assembly 22 including a plurality of lenses, which are formed on a single printed circuit board (PCB), but it is merely one example and the scope of the disclosure is not limited thereto. A configuration of the control circuit 24 may be designed differently according to specifications required in the camera module. In particular, when reducing a magnitude of a voltage applied to a liquid lens 28, the control circuit 24 may be implemented in a single chip. Thus, a size of the camera module mounted on a portable device may be further reduced.

Referring to FIG. 2, as shown in the drawing, the lens assembly 22 may include a first lens unit 100, a second lens unit 200, a liquid lens unit 300, a lens holder 400, and a connecting unit 500. The connection unit 500 may electrically connect an image sensor and a liquid lens to each other, and may include a substrate, a wire, an electrical line, or the like, which will be described later. The illustrated structure of the lens assembly 22 is merely one example, and the structure of the lens assembly 22 may be changed according to specifications required in the camera module. For example, the liquid lens unit 300 is located between the first lens unit 100 and the second lens unit 200. However, in another example, the liquid lens unit 300 may be located above (in front of) the first lens unit 100, and one of the first lens unit 100 and the second lens unit 200 may be omitted. The configuration of the control circuit 24 may be designed differently according to specifications required in the camera device. In particular, when reducing a magnitude of a voltage applied to the lens assembly 22, the control circuit 24 may be implemented in a single chip. Thus, a size of the camera device mounted on a portable device may be further reduced.

FIG. 2 shows an example of a lens assembly 22 included in the camera device.

As shown in the drawing, the lens assembly 22 may include a first lens unit 100, a second lens unit 200, a liquid lens unit 300, a lens holder 400, and a connecting unit 500. The connection unit 500 may electrically connect an image sensor and a liquid lens to each other, and may include a substrate, a wire, an electrical line, or the like, which will be described later. The illustrated structure of the lens assembly 22 is merely one example, and the structure of the lens assembly 22 may be changed according to specifications required in the camera module. For example, the liquid lens unit 300 is located between the first lens unit 100 and the second lens unit 200. However, in another example, the liquid lens unit 300 may be located above (in front of) the first lens unit 100, and one of the first lens unit 100 and the second lens unit 200 may be omitted.

Referring to FIG. 2, the first lens unit 100 is disposed in front of the lens assembly 22, and is a part in which light is incident from the outside of the lens assembly 22. The first lens unit 100 may include at least one lens, or two or more lenses may be aligned with respect to a central axis (PL) to form an optical system.

The first lens unit 100 and the second lens unit 200 may be mounted on the lens holder 400. In this case, a through-hole may be formed at the lens holder 400, and the first lens unit 100 and the second lens unit 200 may be disposed in the through-hole. In addition, the liquid lens unit 300 may be inserted into a space between the first lens unit 100 and the second lens unit 200, which are disposed in the lens holder 400.

Meanwhile, the first lens unit 100 may include a solid lens 110. The solid lens 110 may protrude outside the lens holder 400 to be exposed to the outside. When the solid lens 110 is exposed to the outside, a surface of the lens may be damaged. When the surface of the lens is damaged, quality of an image photographed by the camera module may be deteriorated. In order to prevent or suppress the surface damage of the solid lens 110, a cover glass may be disposed, a coating layer may be formed, or a method of using a wear resistant material for preventing the surface damage of the solid lens 100 may be applied.

The second lens unit 200 may be disposed behind the first lens unit 100 and the liquid lens unit 300, and light incident on the first lens unit 100 from the outside may pass through the liquid lens unit 300 to be incident on the second lens unit 200. The second lens unit 200 may be spaced apart from the first lens unit 100 to be disposed in the through-hole formed in the lens holder 400.

Meanwhile, the second lens unit 200 may include at least one lens, and when two or more lenses are included, the second lens unit 200 may be aligned with respect to the central axis (PL) to form an optical system.

The liquid lens unit 300 may be disposed between the first lens unit 100 and the second lens unit 200, and may be inserted into an insertion opening 410 in the lens holder 400. The insertion opening 410 may be formed by opening a portion of a side surface of the lens holder 400. That is, the liquid lens may be disposed to be inserted through the insertion opening 410 in the side surface of the lens holder 400. The liquid lens unit 300 may also be aligned with respect to the center axis PL like the first lens unit 100 and the second lens unit 200.

The liquid lens unit 300 may include a lens region 310. The lens region 310 is a region through which light passed through the first lens unit 100 is transmitted, and at least a part thereof may contain a liquid. For example, the lens region 310 may include two types of liquids, i.e., a conductive liquid and a non-conductive liquid together, and the conductive liquid and the non-conductive liquid may form a boundary surface without being mixed with each other. The boundary surface between the conductive liquid and the non-conductive liquid may be deformed by a driving voltage applied through the connection unit 500 to change a curvature of an interface of the liquid lens 28 or a focal length of the liquid lens. When the deformation of the boundary surface or the change of the curvature is controlled, the liquid lens unit 300 and the camera module including the same may perform an auto-focusing function, a camera-shake correction function, and the like.

FIGS. 3A and 3B are views for describing a driving method of a liquid lens.

First, (a) of FIG. 3A illustrates that a first voltage V1 is applied to the liquid lens 28 so that the liquid lens operates like a concave lens.

Next, (b) of FIG. 3A illustrates that a second voltage V2 larger than the first voltage V1 is applied to the liquid lens 28 so that the liquid lens does not change a traveling direction of light.

Next, (c) of FIG. 3A illustrates that a third voltage V3 larger than the second voltage V2 is applied to the liquid lens 28 so that the liquid lens operates like a convex lens.

Meanwhile, FIG. 3A illustrates that a curvature or a diopter of the liquid lens is changed depending on a level of the applied voltage, but the embodiment is not limited thereto, and the curvature or the diopter of the liquid lens may be changed depending on a pulse width of an applied pulse.

Next, (a) of FIG. 3B illustrates that the interfaces in the liquid lens 28 have the same curvature so that the liquid lens operates like a convex lens.

That is, according to (a) of FIG. 3B, incident light Lpaa is concentrated and corresponding output light Lpab is output.

Next, (b) of FIG. 3B illustrates that the traveling direction of light is changed upward as an interface in the liquid lens 28 has an asymmetric curved surface.

That is, according to (b) of FIG. 3B, the incident light Lpaa is concentrated upward, and corresponding output light Lpac is output.

FIG. 4 shows a liquid lens of which focal length is adjusted according to a driving voltage. Specifically, (a) shows the liquid lens 28 included in the lens assembly 22 (see FIG. 2), and (b) shows an equivalent circuit of the liquid lens 28.

First, referring to (a) of FIG. 4, the liquid lens 28 of which focal length is adjusted according to the driving voltage may be applied with a voltage via individual electrodes LA, LB, LC, and LD disposed in four different directions with the same distance. The individual electrodes may be disposed with the same distance with respect to the central axis of the liquid lens, and may include four individual electrodes. The four individual electrodes may be disposed at four corners of the liquid lens, respectively. When the voltage is applied via the individual electrodes L1, L2, L3, and L4, a boundary surface between a conductive liquid and a non-conductive liquid disposed in the lens region 310 may be deformed by the driving voltage which is generated by interaction between the applied voltage and a voltage applied to a common electrode COM described later.

In addition, referring to (b) of FIG. 4, the lens 28 is applied with an operating voltage from different individual electrodes LA, LB, LC, and LD at one side thereof, and the other side of the lens 28 may be described as a plurality of capacitors 30 connected to the common electrode COM. Here, the plurality of capacitors 30 included in the equivalent circuit may have a small capacitance of about several tens to 200 pico-farads (pF) or less. The electrodes of the liquid lens described above may also be referred to as terminals, electrode sectors, or sub-electrodes in this disclosure.

FIGS. 5A and 5B show a structure of a liquid lens.

As shown in FIG. 5A, the liquid lens 28 may include liquids, a first plate, and electrodes. Liquids 122 and 124 accommodated in the liquid lens 28 may include a conductive liquid and a non-conductive liquid. A first plate 114 may include a cavity 150 or a hole in which the conductive liquid and the non-conductive liquid are disposed. The cavity 150 may have an inclined surface. Electrodes 132 and 134 may be disposed on the first plate 114, and may be disposed above the first plate 114 or below the first plate 114.

The liquid lens 28 may further include a second plate 112, which may be disposed above (below) the electrodes 132 and 134. In addition, the liquid lens 28 may further include a third plate 116, which may be disposed below (above) the electrodes 132 and 134.

As shown in the drawing, one embodiment of the liquid lens 28 may include an interface 130 formed by different first and second liquids 122 and 124. In addition, at least one substrate 142 and 144 for supplying a voltage to the liquid lens 28 may be included. A corner of the liquid lens 28 may be thinner than a central portion of the liquid lens 28. The second plate may be disposed on an upper surface of the liquid lens and the third plate may be disposed on a lower surface of the liquid lens, but the second plate or the third plate is not disposed on a part of the upper surface or the lower surface of the corner of the liquid lens, and thus a thickness of the corner of the liquid lens may be thinner than that of the center portion thereof. The electrodes may be exposed from the upper surface or the lower surface of the corner of the liquid lens.

The liquid lens 28 may include two different types of liquids, for example, the first liquid 122 and the second liquid 124, and a curvature and shape of the interface 130 formed by the first and second liquids 122 and 124 may be adjusted by a driving voltage supplied to the liquid lens 28.

In this case, the first liquid 122 may be a conductive liquid. In addition, the second liquid 124 may be a non-conductive liquid.

The first liquid 122 has conductivity, and for example, may be formed by mixing ethylene glycol and sodium bromide (NaBr).

The second liquid 124 may be oil, for example, phenyl-based silicone oil.

Each of the first liquid 122 and the second liquid 124 may include at least one of a germicide or an antioxidant. The antioxidant may be a phenyl type antioxidant or a phosphorus (P) type antioxidant. In addition, the germicide may be any one of alcohol type, aldehyde type, and phenol type germicide. As described above, when each of the first liquid 122 and the second liquid 124 contains the antioxidant and the germicide, it is possible to prevent the first and second liquids 122 and 124 from being oxidized or prevent changes in physical properties of the first and second liquids 122 and 124 due to growth of microorganisms.

That is, a plurality of first and second liquids 122 and 124 may be accommodated in a cavity, and may include the first liquid 122 having conductivity and the second liquid (or insulating liquid) 124 having non-conductivity. The first liquid LQ1 and the second liquid LQ2 do not mix with each other, and the interface 130 may be formed at a contact portion between the first and second liquids 122 and 124. For example, the second liquid 124 may be disposed on the first liquid 122, but the embodiment is not limited thereto. For example, unlike the one shown in the drawing, the first liquid 122 may be disposed on the second liquid 124.

In this case, the first liquid 122 and the second liquid 124 may be accommodated in the cavity at different specific gravities.

That is, in case of the liquid lens, a curvature, a position, a shape, and the like of the interface 130 between the first liquid 122 and the second liquid 124 may be changed by using a voltage of the electrode to perform an autofocusing function of a camera. In addition, in the case of the liquid lens, the curvature of the interface is shown asymmetrically with respect to a center of an optical axis by applying asymmetrically the voltage applied to a plurality of electrodes, thereby performing a camera-shake prevention function.

Meanwhile, the driving voltage supplied to the liquid lens 28 may be transmitted via the connection unit 500. The connection unit may include at least one of the first substrate 142 and the second substrate 144. When the connection unit includes the first substrate 142 and the second substrate 144, the second substrate 144 may transmit a voltage to each of a plurality of individual electrodes, and the first substrate 142 may transmit a voltage to a common electrode. The number of the plurality of individual electrodes may be four, and the second substrate 144 may transmit a voltage to each of the four individual electrodes. The voltage supplied via the second substrate 144 and the first substrate 142 may be applied to the plurality of electrodes 134 and 132 disposed at or exposed from each corner of the liquid lens 28.

In addition, the liquid lens 28 may include the third plate 116 and the second plate 112 containing a transparent material and the first plate 114 located between the third plate 116 and the second plate 112 and including an open region having a predetermined inclined surface.

Further, the liquid lens 28 may include the cavity 150, which is defined by the third plate 116, the second plate 112, and the open region of the first plate 114. Here, the cavity 150 may be filled with the first and second liquids 122 and 124 of different types (e.g., the conductive liquid and the non-conductive liquid) as described above, and the interface 130 may be formed between the first and second liquids 122 and 124 of different types.

In addition, at least one of the two liquids 122 and 124 accommodated in the liquid lens 28 may be conductive, and the liquid lens 28 may include the two electrodes 132 and 134 disposed above and below the first plate 114. The first plate 114 may have the inclined surface and may further include an insulating layer 118 disposed on the inclined surface. The conductive liquid may be in contact with the insulating layer 118. Here, the insulating layer 118 may cover one of the two electrodes 132 and 134 (e.g., the individual electrode 134), and may cover or expose a portion of the other electrode (e.g., the common electrode 132) so as to apply electrical energy to the conductive liquid (e.g., 122). Here, the common electrode 132 may include at least one electrode sector (e.g. COM), and the individual electrode 134 may include two or more electrode sectors (e.g., LA, LB, LC, and LD). For example, the individual electrode 134 may include a plurality of electrode sectors, which are sequentially disposed in a clockwise direction with respect to the optical axis. The electrode sectors may be referred to as sub-electrodes or terminals of the liquid lens.

One or a plurality of substrates 142 and 144 for transmitting a voltage may be connected to the two electrodes 132 and 134 included in the liquid lens 28. The focal length of the liquid lens 28 may be adjusted while changing the curvature, bending or inclination of the interface 130 formed in the liquid lens 28 according to the driving voltage.

Referring to FIG. 5B, a first individual electrode LA (134a) and a second individual electrode LB (134b) among the plurality of individual electrodes LA to LD (134a to 134d), are formed to be inclined, and it is illustrated that the size decreases from a lower portion to an upper portion.

Meanwhile, unlike FIG. 5B, the plurality of individual electrodes LA to LD (134a to 134d) may be formed at the upper portion, which is the position of the common electrode 132, and the common electrode 132 may also be formed at the lower portion.

Meanwhile, FIGS. 5A and 5B illustrate four electrodes as the plurality of individual electrodes, but the embodiment is not limited thereto, and two or more various numbers of electrodes may be formed.

Meanwhile, in FIG. 5B, after a pulse-shaped voltage is applied to the common electrode 132, when the pulse-shaped voltage is applied to the first individual electrode LA (134*a*) and the second individual electrode LB (134*b*) after a predetermined time, a potential difference occurs between the common electrode 132 and the first individual electrode LA (134*a*) and the second individual electrode LB (134*b*), and accordingly, a shape of the first liquid 122 having conductivity is changed, and a shape of the interface 130 in the liquid lens 28 is changed in response to the change in the shape of the first liquid 122.

Meanwhile, the present embodiment provides a method for sensing simply and quickly the curvature of the interface 130 formed according to electric signals applied to each of the plurality of individual electrodes LA to LD (134*a* to 134*d*) and the common electrode 132.

To this end, a sensor unit (not shown) in the present invention senses a size or change of an area of a boundary region Ac0 between the insulating layer 118 on any one individual electrode (e.g., the first individual electrode 134*a*) of the individual electrodes in the liquid lens 28 and the first liquid 122.

FIG. 5B illustrates AM0 as the area of the boundary region Ac0. In particular, it is illustrated that the area of the boundary region Ac0 in contact with the first liquid 122 in the inclined portion of the insulating layer 118 on the first individual electrode 134*a* is AM0.

FIG. 5B illustrates that the interface 130 is not concave or convex, and as an example, is in parallel with the first plate 114 or the like. In this case, the curvature of the interface 130, for example, may be defined as 0.

Meanwhile, as shown in FIG. 5B, a capacitance C may be formed in the boundary region Ac0 in contact with the first liquid 122 in the inclined portion of the insulating layer 118 on the first individual electrode 134*a* according to the following Equation 1.

$$C = \varepsilon \frac{A}{d}$$ [Equation 1]

Here, ε may represent a dielectric constant of the insulating layer 118 that is a dielectric, A may represent an area of the boundary region Ac0, and d may represent a thickness of the insulating layer 118.

Here, assuming that εd is a fixed value, it is possible that the area of the boundary region Ac0 has a great influence on the capacitance C.

That is, the larger the area of the boundary region Ac0, the larger the capacitance C formed in the boundary region Ac0.

Meanwhile, the more the curvature of the interface 130 is changed, the more the area of the boundary region Ac0 is changed, and thus, in the embodiment, the sensor unit may be used to sense the area of the boundary region Ac0, or to sense the capacitance C formed in the boundary region Ac0.

Meanwhile, the capacitance of FIG. 5B may be defined as CAc0.

FIGS. 6A to 6E are views illustrating various curvatures of a liquid lens 28.

First, FIG. 6A illustrates that a first curvature 130*a* is formed at the interface 130 based on the pulse-shaped voltage applied to the plurality of individual electrodes LA to LD (134*a* to 134*d*) and the common electrode 132, respectively.

FIG. 6A illustrates AMa (>AM0) as an area of a boundary region Aaa as the first curvature 130*a* is formed at the interface 130. In particular, it is illustrated that the area of the boundary region Aaa in contact with the first liquid 122 in the inclined portion of the insulating layer 118 on the first individual electrode 134*a* is AMa.

According to the Equation 1, the area of the boundary region Aaa in FIG. 6A is larger than that of FIG. 5B, so that a capacitance of the boundary region Aaa becomes larger. Meanwhile, the capacitance of FIG. 6A may be defined as CAaa, and has a larger value than CAc0 that is the capacitance of FIG. 5B.

At this time, the first curvature 130*a* may be defined as having a positive polarity value. For example, the first curvature 130*a* may be defined as having a +2 level.

Next, FIG. 6B illustrates that a second curvature 130*b* is formed at the interface 130 based on the pulse-shaped voltage applied to the plurality of individual electrodes LA to LD (134*a* to 134*d*) and the common electrode 132, respectively.

FIG. 6B illustrates AMb (>AMa) as an area of a boundary region Aba as the second curvature 130*b* is formed at the interface 130. In particular, it is illustrated that the area of the boundary region Aba in contact with the first liquid 122 in the inclined portion of the insulating layer 118 on the first individual electrode 134*a* is AMb.

According to Equation 1, the area of the boundary region Aba in FIG. 6B is larger than that of FIG. 6A, so that a capacitance of the boundary region Aba becomes larger. Meanwhile, the capacitance of FIG. 6B may be defined as CAba, and has a larger value than CAaa that is the capacitance of FIG. 6A.

At this time, the second curvature 130*b* may be defined as having a positive polarity value smaller than the first curvature 130*a*. For example, the second curvature 130*b* may be defined as having a +4 level.

Meanwhile, according to FIGS. 6A and 6B, the liquid lens 28 operates as a convex lens, and accordingly, output light LP1*a* in which incident light LP1 is concentrated is output.

Next, FIG. 6C illustrates that a third curvature 130*c* is formed at the interface 130 based on the pulse-shaped voltage applied to the plurality of individual electrodes LA to LD (134*a* to 134*d*) and the common electrode 132, respectively.

In particular, FIG. 6C illustrates AMa as an area of a left boundary region Aca, and illustrates AMb (>AMa) as an area of a right boundary region Acb.

In particular, it is illustrated that the area of the boundary region Aca in contact with the first liquid 122 in the inclined portion of the insulating layer 118 on the first individual electrode 134*a* is AMa, and the area of the boundary region Acb in contact with the first liquid 122 in the inclined portion of the insulating layer 118 on the second individual electrode 134*b* is AMb.

Accordingly, a capacitance of the left boundary region Aca may be CAaa, and a capacitance of the right boundary region Acb may be Caba.

At this time, the third curvature 130*c* may be defined as having a positive polarity value. For example, the third curvature 130*c* may be defined as having a +3 level.

Meanwhile, according to FIG. 6C, the liquid lens 28 operates as a convex lens, and accordingly, output light LP1b in which incident light LP1 is further concentrated on one side is output.

Next, FIG. 6D illustrates that a fourth curvature 130d is formed at the interface 130 based on the pulse-shaped voltage applied to the plurality of individual electrodes LA to LD (134a to 134d) and the common electrode 132, respectively.

FIG. 6D illustrates AMd (<AM0) as an area of a boundary region Ada as the fourth curvature 130d is formed at the interface 130. In particular, it is illustrated that the area of the boundary region Ada in contact with the first liquid 122 in the inclined portion of the insulating layer 118 on the first individual electrode 134a is AMd.

According to the Equation 1, the area of the boundary region Ada in FIG. 6D is smaller than that of FIG. 5BC, so that a capacitance of the boundary region Ada becomes smaller. Meanwhile, the capacitance of FIG. 6D may be defined as CAda, and has a smaller value than CAc0 that is the capacitance of FIG. 6C.

At this time, the fourth curvature 130d may be defined as having a negative polarity value. For example, the fourth curvature 130d may be defined as having a −2 level.

Next, FIG. 6E illustrates that a fifth curvature 130e is formed at the interface 130 based on the pulse-shaped voltage applied to the plurality of individual electrodes LA to LD (134a to 134d) and the common electrode 132, respectively.

FIG. 6E illustrates AMe (<AMd) as an area of a boundary region Aea as the fifth curvature 130e is formed at the interface 130. In particular, it is illustrated that the area of the boundary region Aea in contact with the first liquid 122 in the inclined portion of the insulating layer 118 on the first individual electrode 134a is AMe.

According to the Equation 1, the area of the boundary region Aea in FIG. 6E is smaller than that of FIG. 6D, so that a capacitance of the boundary region Aea becomes smaller. Meanwhile, the capacitance of FIG. 6E may be defined as CAea, and has a smaller value than CAda that is the capacitance of FIG. 6D.

At this time, the fifth curvature 130e may be defined as having a negative polarity value. For example, the fifth curvature 130e may be defined as having a −4 level.

Meanwhile, according to FIGS. 6D and 6E, the liquid lens 28 operates as a concave lens, and accordingly, output light LP1c from which incident light LP1 is diverged is output.

FIG. 7 is an example of an internal block diagram of a camera module according to an embodiment.

Referring to the drawing, the camera module of FIG. 7 includes a liquid lens control circuit, an image sensor 820, an image processor 830, and a gyro sensor 815.

The liquid lens control circuit includes a liquid lens 28, a lens driver 860, a pulse width variable unit 840, and a power supply unit 890.

In addition, the liquid lens control circuit includes a control unit 870, a temperature sensor 850, and a heater 855. Here, the temperature sensor 850 and the heater 855 may also be referred to as a temperature compensation unit for the liquid lens.

Describing an operation of the liquid lens control circuit of FIG. 7, when the pulse width variable unit 840 outputs a pulse width variable signal V in response to a target curvature, the lens driver 860 may output a corresponding voltage to a plurality of individual electrodes and a common electrode of the liquid lens 28 by using the pulse width variable signal V and a voltage Vx of the power supply unit 890.

Specifically, the camera module may largely include the liquid lens control circuit, the image sensor 820 for converting light from the liquid lens 28 in the liquid lens control circuit into an electric signal, and the image processor 830 that performs image processing based on the electric signal from the image sensor.

In addition, the camera module may include the gyro sensor 815.

The image processor 830 may output focus information (AF), and the gyro sensor 815 may output shake information (OIS).

In addition, the control unit 870 may determine the target curvature based on the focus information (AF) and the shake information (OIS).

Meanwhile, the liquid lens control circuit in the embodiment may include the lens driver 860 applying an electric signal to the liquid lens 28, a sensor unit (not shown) for sensing the curvature of the liquid lens 28 formed based on the electric signal, and the control unit 870 for controlling the lens driver 860 so as to form the target curvature of the liquid lens 28 based on the sensed curvature. Here, the sensor unit may sense a size or change of an area of a boundary region Ac0 between an insulating layer on an electrode in the liquid lens 28 and a first liquid 122. Accordingly, the curvature of the lens may be sensed quickly and accurately.

Meanwhile, the liquid lens control circuit according to the embodiment may include the liquid lens 28 of which curvature is variable based on the applied electric signal.

The temperature sensor 850 and the heater 855 may be disposed on a first plate 114. The temperature sensor 850 and the heater 855 may be disposed on the first plate 114 with a predetermined pattern shape. As an example, the temperature sensor 850 and the heater 855 may have a planar shape including triangular protrusions protruding in one direction. However, it is merely one example of the temperature sensor 850 and the heater 855, and may have patterns of other shapes.

For example, the temperature sensor 850 and the heater 855 may have a bracket planar shape bent in one direction. Alternatively, the temperature sensor 850 and the heater 855 may have a serpentine planar shape. Alternatively, the temperature sensor 850 and the heater 855 may have a spring shape.

The temperature sensor 850 and the heater 855 may be disposed on the first plate 114 in singular form. Alternatively, the temperature sensor 850 and the heater 855 may be disposed on the first plate 114 in plural with a predetermined distance therebetween. When each of the temperature sensor 850 and the heater 855 is composed in plural, it is possible to improve the sensing accuracy of the temperature of the liquid lens 28, and accordingly, it is possible to have a desired target temperature of the liquid lens 28 within a short time.

The temperature sensor 850 may be formed of a material of which characteristics (e.g., resistance value) change according to temperature. For example, the temperature sensor 850 may be implemented with a resistor, a thermistor, or the like. The thermistor is a heat-sensitive semiconductor having a resistance value that changes according to temperature.

The heater 855 may be implemented as a resistor that generates heat when a current is flowed, and may be implemented as a conductor having a resistance component, but is not limited to a specific type of the heater 855. That is, any element that generates heat when a current is flowed or a voltage is applied may be used as the heater 855.

Meanwhile, the control unit 870 in the embodiment may determine an individual driving voltage transmitted to each of four individual electrodes. In order to determine a level of the individual driving voltage, the control unit 870 may receive an adjustment variable for determining a level of the individual driving voltage from a separate optical image stabilizer (not shown), the image processor 830, or the like.

For example, the sum of the driving voltages applied to the four individual electrodes may be determined by the auto focusing (AF) function of the camera module, and a deviation of the individual driving voltage that divides the driving voltage may be determined by the optical image stabilizer (OIS) function of the camera module.

For example, information about movement of the camera module may be obtained from the gyro sensor 815 included in the camera module. The information about the movement of the camera module may be transmitted to an optical image stabilizer (not shown), and the optical image stabilizer (not shown) may calculate a value for adjusting the lens in order to compensate the movement of the camera module. The compensation value calculated by the optical image stabilizer allows an image formed by optical signals passing through the liquid lens 28 to move in a specific direction by adjusting an inclination rate and curvature of an interface formed by two liquids in the liquid lens 28. Control of such an operation is possible because the interface in the liquid lens 28 may change curvature in response to voltage levels applied to the individual electrodes.

In addition, the control unit 870 may determine four individual driving voltages by reflecting data determined through lens calibration of the liquid lens 28. The liquid lens 28 may have a minute difference in characteristics due to a process error in a manufacturing process, and such a difference may be converted into data through the lens calibration, which may be used to control the lens.

FIG. 8 is an example of an internal circuit diagram of the lens driver in FIG. 7.

The lens driver 860 may include first upper-arm and lower-arm switching elements Sa and S'a connected in series with each other, and second upper-arm and lower-arm switching elements Sb and S'b connected in series with each other.

At this time, the first upper-arm and lower-arm switching elements Sa and S'a and the second upper-arm and lower-arm switching elements Sb and S'b are connected in parallel with each other.

Electric power from the power supply unit 890 may be supplied to the first upper-arm switching element Sa and the second upper-arm switching element Sb. As an example, a 70V power may be applied from the power supply unit 890 to the first upper-arm switching element Sa and the second upper-arm switching element Sb.

Meanwhile, a voltage may be applied to the common electrode 132 via a node between the first upper-arm switching element Sa and the first lower-arm switching element S'a, and a voltage may be applied to the first electrode LA (134*a*) via a node between the second upper-arm switching element Sb and the second lower-arm switching element S'b.

FIG. 9A is an example of a waveform diagram for describing an operation of the lens driver of FIG. 8, and FIG. 9B is a view referred to for describing a driving voltage supplied to a liquid lens of FIG. 8.

A first cycle of the waveform diagram from FIG. 9A refers to from a time T1 to a time T5. The time T5 may refer to an end time of the first cycle, and may also refer to a start time of a second cycle after the first cycle.

In the embodiment, a temperature compensation algorithm is performed during a part of the period from the time T1 to the time T5 corresponding to the first cycle. Here, the temperature compensation algorithm will be described in more detail below.

First, a high-level control signal CMHP is applied to the Sa switching element at the time T1 which is a start time of the first cycle, and a high-level control signal LAP is applied to the Sb switching element at a time T2.

Meanwhile, a low-level control signal CMHP may be applied to the Sa switching element at a time T3, and at this time, a high-level control signal CMHM is applied to the S'a switching element.

In addition, a low-level control signal LAP may be applied to the Sb switching element at a time T4, and at this time, a high-level control signal LAM may be applied to the S'b switching element.

At this time, the Sb switching element and the S'b switching element may be turned on complementarily.

Specifically, a voltage SLP having a pulse width of Dt1 may be applied to the common electrode COM at the time T1.

Then, a voltage having a pulse width of Dt2 may be applied to the first individual electrode LA at the time T2.

At this time, a curvature formed at the interface 130 in the liquid lens 28 may be variable by a time difference DFF1 between a voltage applied to the common electrode COM and a voltage applied to the first individual electrode LA.

For example, as the time difference DFF1 of the voltage is smaller, the size of the area of the boundary region Ac0 between the electrode and the first liquid 122 may be increased, and accordingly, the capacitance may be increased, and finally, the curvature may be decreased.

Meanwhile, the control unit 870 according to the embodiment allows the temperature compensation algorithm to operate in a period in which the switching element of the lens driver 860 is not switched, that is, a period in which a switching state of the switching element is maintained.

At this time, as shown in FIG. 9B, the switching element is switched at the time T1, the time T2, the time T3, the time T4, and the time T5, respectively. Here, that the switching is performed may refer that the switching state of the switching element is changed. As an example, that the switching state is changed may refer that the state is changed from an on-state to an off-state or from the off-state to the on-state.

Accordingly, the control unit 870 in the embodiment prevents an operation of the temperature compensation algorithm from being performed at a time overlapped with the times T1, T2, T3, T4 and T5.

As shown in the drawing, a period in which the lens driver 860 is not switched in the first cycle includes a first period A1 between the time T1 and the time T2, a second period A2 between the time T2 and the time T3, a third period A3 between the time T3 and the time T4, and a fourth period A4 between the time T4 and the time T5.

Accordingly, the control unit 870 allows the temperature compensation algorithm to operate in only any one of the first period A1, the second period A2, the third period A3 and the fourth period A4.

Here, the temperature compensation algorithm may include an operation of sensing a temperature of the liquid lens 28 by the temperature sensor 850 and an operation of driving a heater for controlling the temperature of the liquid lens according to the sensed temperature.

That is, when the temperature compensation algorithm operates not in the first period A1, the second period A2, the third period A3 and the fourth period A4, but in a period including a time at which the lens driver 860 is switched, noise may be generated due to the switching operation of the lens driver 860, and it is difficult to accurately sense temperature due to the generated noise. Therefore, the control unit 870 in the embodiment allows the temperature compensation algorithm to operate only in a remaining period except the time at which the switching operation of the lens driver 860 is performed.

Meanwhile, that the switching operation of the lens driver 860 is performed may refer that a potential of a voltage applied to at least one of the common electrode and the plurality of individual electrodes of the liquid lens is changed. Here, the change of the potential may refer that a voltage applied to a specific electrode of the liquid lens is changed from a ground voltage to a high voltage corresponding to the driving voltage, or the voltage applied to the specific electrode of the liquid lens is changed from the high voltage corresponding to the driving voltage to the ground voltage. Further, the change in the potential may refer that the voltage applied to the specific electrode of the liquid lens increases from a low potential to a high potential, or the voltage applied to the specific electrode of the liquid lens decreases from a high potential to a lower potential. Therefore, the period in which the lens driver 860 is not switched may include a period in which the potentials of the voltages applied to the common electrode and the plurality of individual electrodes are not changed.

Hereinafter, a timing at which a temperature compensation algorithm according to an embodiment operates will be described in detail.

FIGS. 10A to 10E are diagrams referred to for describing an operation timing of a temperature compensation algorithm according to an embodiment.

Hereinafter, each of a first period to a fourth period may be divided based on a time at which a potential of a voltage applied to at least one of a common electrode and a plurality of individual electrodes is changed.

Referring to FIG. 10A, the temperature compensation algorithm may operate in a first period A1. That is, the first period A1 is a period between a time T1 and a time T2. Specifically, the first period A1 may be a period in which a high voltage (e.g., 10V to 80V) is supplied to a common electrode COM, and a ground voltage (0V) is supplied to an individual electrode. That is, the time T1 is a rising-edge time at which the voltage applied to the common electrode COM rises from the ground voltage to the high voltage. In addition, the time T2 is a rising-edge time at which the voltage applied to the individual electrode rises from the ground voltage to the high voltage. Here, the high voltage may also be a driving voltage.

However, when an operation timing AT of the temperature compensation algorithm has a high level in the entire period between the time T1 and the time T2, switching noise may occur until a switching state of a switching element of the lens driver 860 is stabilized, thereby reducing the accuracy of the temperature compensation algorithm.

Therefore, the control unit 870 may allow the operation timing AT of the temperature compensation algorithm to have a high level from a time T1-1 which is a predetermined time after the time T1 to a time T1-2 which is a predetermined time before the time T2. Here, that the operation timing AT of the temperature compensation algorithm has a high level refers that an operation related to the temperature compensation algorithm is activated. In addition, when the operation timing AT of the temperature compensation algorithm has a low level, the operation related to the temperature compensation algorithm may be deactivated.

Meanwhile, the individual electrode in the embodiment is in plural. In addition, a driving voltage is applied to the plurality of individual electrodes, respectively. At this time, driving voltages having different time differences may be applied to the individual electrodes based on the driving voltage applied to the common electrode. Accordingly, the time T2 may be set with reference to a driving voltage having a smallest time difference as compared with the driving voltage applied to the common electrode among the driving voltages applied to the plurality of individual electrodes. That is, when a voltage applied to a first individual electrode among the plurality of individual electrodes has the smallest time difference as compared with the voltage applied to the common electrode, the time T2 is a rising-edge time at which the voltage applied to the first individual electrode rises from the ground voltage to the high voltage.

Referring to FIG. 10B, the temperature compensation algorithm may operate in a second period A2. That is, the second period A2 is a period between a time T2 and a time T3. Specifically, the second period A2 may be a period in which a high voltage (e.g., 10V to 80V) is supplied to a common electrode COM, and a ground voltage (0V) is supplied to an individual electrode. That is, the time T2 is a rising-edge time at which the voltage applied to the individual electrode rises from the ground voltage to the high voltage. In addition, the time T3 is a falling-edge time at which the voltage applied to the common electrode drops from the high voltage to the ground voltage.

However, when an operation timing AT of the temperature compensation algorithm has a high level in the entire period between the time T2 and the time T3, switching noise may occur until a switching state of a switching element of the lens driver 860 is stabilized, thereby reducing the accuracy of the temperature compensation algorithm.

Therefore, the control unit 870 may allow the operation timing AT of the temperature compensation algorithm to have a high level from a time T2-1 which is a predetermined time after the time T2 to a time T2-2 which is a predetermined time before the time T3. Here, that the operation timing AT of the temperature compensation algorithm has a high level refers that an operation related to the temperature compensation algorithm is activated. In addition, when the operation timing AT of the temperature compensation algorithm has a low level, the operation related to the temperature compensation algorithm may be deactivated.

Meanwhile, the individual electrode in the embodiment is in plural. In addition, a driving voltage is applied to the plurality of individual electrodes, respectively. At this time, driving voltages having different time differences may be applied to the individual electrodes based on the driving voltage applied to the common electrode. Accordingly, the time T2 in the second period A2 may be set with reference to a driving voltage having a largest time difference as compared with the driving voltage applied to the common electrode among the driving voltages applied to the plurality of individual electrodes. That is, when a voltage applied to a first individual electrode among the plurality of individual electrodes has the largest time difference as compared with the voltage applied to the common electrode, the time T2 is a rising-edge time at which the voltage applied to the first individual electrode rises from the ground voltage to the high voltage.

Referring to FIG. 10C, the temperature compensation algorithm may operate in a third period A3. That is, the third period A3 is a period between a time T3 and a time T4. Specifically, the third period A3 may be a period in which a ground voltage is supplied to a common electrode COM, and a high voltage is supplied to an individual electrode. That is, the time T3 is a falling-edge time at which the voltage applied to the common electrode drops from the high voltage to the ground voltage. In addition, the time T4 is a falling-edge time at which the voltage applied to the individual electrode drops from the high voltage to the ground voltage.

However, when an operation timing AT of the temperature compensation algorithm has a high level in the entire period between the time T3 and the time T4, switching noise may occur until a switching state of a switching element of the lens driver 860 is stabilized, thereby reducing the accuracy of the temperature compensation algorithm.

Therefore, the control unit 870 may allow the operation timing AT of the temperature compensation algorithm to have a high level from a time T3-1 which is a predetermined time after the time T3 to a time T3-2 which is a predetermined time before the time T4. Here, that the operation timing AT of the temperature compensation algorithm has a high level refers that an operation related to the temperature compensation algorithm is activated. In addition, when the operation timing AT of the temperature compensation algorithm has a low level, the operation related to the temperature compensation algorithm may be deactivated.

Meanwhile, the individual electrode in the embodiment is in plural. In addition, a driving voltage is applied to the plurality of individual electrodes, respectively. At this time, driving voltages having different time differences may be applied to the individual electrodes based on the driving voltage applied to the common electrode. Accordingly, the time T4 in the third period A3 may be set with reference to a driving voltage having a smallest time difference as compared with the driving voltage applied to the common electrode among the driving voltages applied to the plurality of individual electrodes. That is, when a voltage applied to a first individual electrode among the plurality of individual electrodes has the smallest time difference as compared with the voltage applied to the common electrode, the time T4 is a falling-edge time at which the voltage applied to the first individual electrode drops from the high voltage to the ground voltage.

Referring to FIG. 10D, the temperature compensation algorithm may operate in a fourth period A4. That is, the fourth period A4 is a period between a time T4 and a time T5. Specifically, the fourth period A4 may be a period in which a ground voltage is supplied to a common electrode COM, and a high voltage is supplied to an individual electrode. That is, the time T4 is a falling-edge time at which the voltage applied to the individual electrode drops from the high voltage to the ground voltage. In addition, the time T5 is a rising-edge time at which the voltage applied to the common electrode rises from the ground voltage to the high voltage.

However, when an operation timing AT of the temperature compensation algorithm has a high level in the entire period between the time T4 and the time T5, switching noise may occur until a switching state of a switching element of the lens driver 860 is stabilized, thereby reducing the accuracy of the temperature compensation algorithm.

Therefore, the control unit 870 may allow the operation timing AT of the temperature compensation algorithm to have a high level from a time T4-1 which is a predetermined time after the time T4 to a time T4-2 which is a predetermined time before the time T5. Here, that the operation timing AT of the temperature compensation algorithm has a high level refers that an operation related to the temperature compensation algorithm is activated. In addition, when the operation timing AT of the temperature compensation algorithm has a low level, the operation related to the temperature compensation algorithm may be deactivated.

Meanwhile, the individual electrode in the embodiment is in plural. In addition, a driving voltage is applied to the plurality of individual electrodes, respectively. At this time, driving voltages having different time differences may be applied to the individual electrodes based on the driving voltage applied to the common electrode. Accordingly, the time T4 in the fourth period A4 may be set with reference to a driving voltage having a largest time difference as compared with the driving voltage applied to the common electrode among the driving voltages applied to the plurality of individual electrodes. That is, when a voltage applied to a first individual electrode among the plurality of individual electrodes has the largest time difference as compared with the voltage applied to the common electrode, the time T5 is a falling-edge time at which the voltage applied to the first individual electrode drops from the high voltage to the ground voltage.

Meanwhile, FIGS. 10A to 10D show that the timing of the temperature compensation algorithm has a high level only in any one of the first period A1 to the fourth period A4, but the timing of the temperature compensation algorithm may also have a high level in a plurality of periods.

Referring to FIG. 10E, the temperature compensation algorithm in the embodiment may be activated with a high level in at least one of the first period A1 to the fourth period A4. Preferably, the temperature compensation algorithm may be performed in a remaining period except transition periods C1, C2, C3, and C4 in the first period A1 to the fourth period A4. Here, the transition periods may include a first transition period C1 between a time T1-2 and a time T2-1, a second transition period C2 between a time T2-2 and a time T3-1, a third transition period C3 between a time T3-2 and a time T4-1, and a fourth transition period C4 from a time 4-2 to the time T1-1 which is a next cycle. That is, the first transition period C1 may be a period that is transitioned from the first period A1 to the second period A2, the second transition period C2 may be a period that is transitioned from the second period A2 to the third period A3, the third transition period C3 may be a period that is transitioned from the third period A3 to the fourth period A4, and the fourth transition period C4 may be a period that is transitioned from the fourth period A4 to the first period A1 again.

Meanwhile, the temperature compensation algorithm described above may include a first operation for sensing a temperature of the liquid lens 28 by the temperature sensor 850, and a second operation for driving a heater for controlling the temperature of the liquid lens 28 according to the sensed temperature.

At this time, the first operation and the second operation may be activated in the period in which the operation timing AT of the temperature compensation algorithm described in FIGS. 10A to 10E has the high level. However, the first operation for sensing the temperature of the liquid lens 28 may be activated at a time that avoids a time at which a driving state of the heater 855 is changed.

That is, in the second operation for driving the heater 855, a switching operation is performed to change the driving state of the heater 855. In other words, the second operation for driving the heater 855 includes a period switching a switch to an on-state in order to change the operation state of the heater 855 to an on-state, and a period switching a switch to an off-state in order to change the operation state of the heater 855 to an off-state.

In addition, in the embodiment, the first operation for sensing the temperature of the liquid lens 28 by the temperature sensor 850 may be activated in a remaining period that avoids the switching period formed for changing the operation state of the heater 855 among the periods in which the operation timing AT of the temperature compensation algorithm has the high level.

FIGS. 11A and 11B are diagrams referred to for describing a temperature sensing timing and a heater driving timing according to an embodiment.

Referring to FIG. 11A, a temperature sensing timing ST and a heater driving timing HT may have a high level in any one of the plurality of periods described in FIGS. 10A to 10E.

That is, the temperature sensing timing ST and the heater driving timing HT may have a high level in a second period A2. The second period A2 may be a period between a time T2-1 and a time T2-2 of the period between a time T2 and a time T3. At this time, the heater driving timing HT may be transitioned to a high level at the time T2-1, and may be transitioned to a low level at the time T2-2. At this time, the switching operation for changing the operation state of the heater 855 is performed at the time T2-1 and the time T2-2. Accordingly, when a temperature sensing operation by the temperature sensor 850 is performed at the time T2-1 and the time T2-2, the temperature sensing operation may not be performed accurately due to the switching noise by the heater 855. Therefore, in the embodiment, the temperature sensing operation by the temperature sensor 850 may be performed in a remaining period that avoids the period in which the heater 855 is switched.

That is, the temperature sensing timing ST may have a high level in a third period A3, like the heater driving timing HT. At this time, the temperature sensing timing ST may be transitioned from a low level to a high level at a time T2-3 which is a predetermined time after the time T2-1 at which an operating state of the heater is changed from an off-state to an on-state. In addition, the temperature sensing timing ST may be transitioned from a high level to a low level at a time T2-4 which is a predetermined time before the time T2-2 at which the operating state of the heater is changed from the on-state to the off-state. In other words, the temperature sensing operation by the temperature sensor 850 may be started after the heater 855 is operated in the on-state, and may be ended before the heater 855 is changed to the off-state.

Accordingly, the influence of the switching noise generated by the switching operation of the heater 855 may be minimized, thereby improving the accuracy of temperature sensing.

Referring to FIG. 11B, the temperature sensing timing ST and the heater driving timing HT may have a high level in different periods of the plurality of periods described in FIGS. 10A to 10E.

That is, the temperature sensing timing ST may have a high level in the third period A3 of the plurality of periods. In addition, the heater driving timing HT may have a high level in the period A2 different from the period in which the temperature sensing timing ST has a high level.

That is, the second period A2 may be a period between a time T2-1 and a time T2-2 of the period between a time T2 and a time T3. At this time, the heater driving timing HT may be transitioned to a high level at the time T2-1, and may be transitioned to a low level at the time T2-2. At this time, the switching operation for changing the operation state of the heater 855 is performed at the time T2-1 and the time T2-2. Accordingly, when a temperature sensing operation by the temperature sensor 850 is performed at the time T2-1 and the time T2-2, the temperature sensing operation may not be performed accurately due to the switching noise by the heater 855. Therefore, in the embodiment, the temperature sensing operation by the temperature sensor 850 may be performed in a remaining period that avoids the period in which the heater 855 is switched.

That is, the temperature sensing timing ST may have a high level in a period different from the period in which the heater driving timing HT has a high level. In other words, the temperature sensing operation by the temperature sensor 850 may be activated in a period different from a period in which the heater 855 operates.

Accordingly, the influence of the switching noise generated by the switching operation of the heater 855 may be minimized, thereby improving the accuracy of temperature sensing.

Hereinafter, the temperature sensing operation and the heater driving operation by the control unit 870 will be described in detail.

FIG. 12 is a diagram for describing an operation of a temperature compensation algorithm according to an embodiment.

Referring to FIG. 12, a camera module according to an embodiment includes a control unit 870 connected to a temperature sensor 850 and a heater 855 to perform sensing a temperature, or controlling an operating state of a heater based on the sensed temperature.

To this end, the control unit 870 may include a temperature sensing unit 871 and a heater controller 872.

The temperature sensing unit 871 may be connected to the temperature sensor 850. In this case, when the temperature sensor 850 of the embodiment is configured in plural, accordingly, the temperature sensing units 871 may be disposed in plural.

Accordingly, one end of the temperature sensor 850 may be electrically connected to the temperature sensing unit 871.

In addition, the other end of the temperature sensor 850 may be connected to a reference potential (e.g., ground) or a second resistor R2.

The heater controller 872 may be connected to one end of the heater 855.

In addition, the other end of the heater 855 may be connected to a reference potential (e.g., ground). According to the embodiment, the temperature sensing unit 871 may include a sensing driver 871-1 and a temperature information measuring unit 871-2.

The sensing driver 871-1 serves to supply a driving signal to the temperature sensor 850. Connection relationship between the temperature sensing unit 871 and the temperature sensor 850 will be described below.

For example, the sensing driver 871-1 may supply a driving signal via one end of the temperature sensor 850. The driving signal supplied from the sensing driver 871-1 may have a current form or a voltage form.

According to one embodiment, when the sensing driver 871-1 provides a current-formed driving signal, the sensing driver 871-1 may include only a current source IS in FIG. 12.

According to another embodiment, when the sensing driver 871-1 supplies a voltage-formed driving signal, the sensing driver 871-1 may include only a supply voltage VDS and a first resistor R1 in FIG. 12.

According to still another embodiment, when the sensing driver 871-1 selectively supplies the current-formed or voltage-formed driving signal, the sensing driver 871-1 may include first and second switches S1 and S2 as well as the current source IS, the power supply voltage VDS, and the first resistor R1, and the camera module may further include third to sixth switches S3 to S6 and the second resistor R2. Turn-on and turn-off of the first to sixth switches S1 to S6 may be adjusted by the control unit 870. To this end, the control unit 870 may further include a separate switch controller 873. The switch controller 873 may generate a switch control signal for turning-on or turning-off the first to sixth switches S1 to S6.

The first switch S1 may be disposed between the constant current source IS and one end of the temperature sensor 850, and the second switch S2 may be disposed between the first resistor R1 and one end of the temperature sensor 850.

The third switch S3 may be disposed between the temperature information measuring unit 871-2 and one end of the temperature sensor 850, and the fourth switch S4 may be disposed between the temperature information measuring unit 871-2 and the other end of the temperature sensor 850.

The fifth switch S5 may be disposed between the other end of the temperature sensor 850 and the reference potential (or, ground), and the sixth switch S6 may be disposed between the other end of the temperature sensor 850 and the second resistor R2.

The temperature information measuring unit 871-2 may be connected to the temperature sensor 850 to measure temperature information of the temperature sensor 850.

For example, when the sensing driver 871-1 supplies the current-formed driving signal, the temperature information measuring unit 871-2 may be connected to one end of the temperature sensor 850 to measure the temperature information of the temperature sensor 850. To this end, the constant current source IS may be connected to one end of the temperature sensor 850, and may supply the current-formed driving signal to one end of the temperature sensor 850.

Alternatively, when the sensing driver 871-1 supplies the voltage-formed driving signal, the temperature information measuring unit 871-2 may be connected to the other end of the temperature sensor 850 to measure the temperature information of the temperature sensor 850. To this end, the first resistor R1 (or, load resistor) may be connected between the voltage-formed driving signal and one end of the temperature sensor 850.

That is, the temperature information measuring unit 871-2 may measure a voltage VS1 at one end of the temperature sensor 850 or a voltage VS2 at the other end of the temperature sensor 850, and may measure the temperature information of the temperature sensor 850 from the measured voltage (VS1 or VS2). To this end, the temperature information measuring unit 871-2 may include an analog/digital converter 871-3. The analog/digital converter 871-3 may measure the voltage (VS1 or VS2) and convert the measured voltage (VS1 or VS2) to a digital form, and may output the converted result as the temperature information via an output terminal OUT.

Hereinafter, a principle of measuring the temperature information of the temperature sensor 850 from the temperature sensing unit 871 will be described as follows.

FIG. 13 shows an equivalent circuit when a driving signal is supplied in a current form.

First, when the sensing driver 871-1 supplies the driving signal in the current form, an operation of the temperature information measuring unit 871-2 will be seen with reference to FIGS. 12 and 13 as follows.

A seventh switch S7 may be disposed between a resistor R3 and one end of the heater 855.

The first, third and fifth switches S1, S3, and S5 are turned on, and the remaining switches that are the second, fourth and sixth switches S2, S4, and S6 and the seventh switch S7 are turned off. As a result, the camera module shown in FIG. 12 may be connected as shown in FIG. 13.

Referring to FIG. 13, a current I output from the constant current source IS flows in an arrow direction. At this time, the voltage VS1 sensed at the temperature information measuring unit 871-2 is as shown in the following Equation 2.

$$VS1 = I*RT \quad \text{[Equation 2]}$$

Here, RT represents a resistance value RT of the temperature sensor 850.

The sensed voltage VS1 in Equation 2 is converted into a digital form at the analog/digital converter 871-3, and is output as the temperature information of the temperature sensor 850 via the output terminal OUT.

A temperature of the temperature sensor 850 may be estimated by using the temperature information output via the output terminal OUT. That is, in the Equation 2, the current I is a constant fixed value supplied from the constant current source IS, and thus VS1 may be used to know RT. When the temperature sensor 850 is implemented as a negative type thermistor having a resistance value RT inversely proportional to temperature, the resistance value RT decreases as the temperature increases. However, when the temperature sensor 850 is implemented as a positive type thermistor having a resistance value RT proportional to temperature, the resistance value RT increases as the temperature increases. Thus, the digital-formed voltage VS1 output via the output terminal OUT from the temperature information measuring unit 871-2 may be converted as the temperature of the temperature sensor 850.

FIG. 14 shows an equivalent circuit when a driving signal is supplied in a voltage form.

When the sensing driver 871-1 supplies the driving signal in the voltage form, an operation of the temperature information measuring unit 871-2 will be seen with reference to FIGS. 12 and 14 as follows.

The second, fourth and sixth switches S2, S4, and S6 are turned on, and the first, third and fifth switches S1, S3, and S5 and the seventh switch S7 are turned off. As a result, the camera module shown in FIG. 12 may be connected as shown in FIG. 14.

Referring to FIG. 14, when the voltage-form driving signal is applied via the first resistor R1 from the supply voltage VDS, the voltage VS2 at the other end of the temperature sensor 850, which is sensed at the temperature information measuring unit 871-2, is as shown in the following Equation 3.

$$VS2 = VDS * \frac{R2}{RT + R2} \quad \text{[Equation 3]}$$

Here, RT represents the resistance value RT of the temperature sensor 850 as described above, VDS is a value fixed as a supply voltage, and R2 has a resistance value fixed as an external resistor.

The sensed voltage VS2 is converted into a digital form at the analog/digital converter 871-3, and may be output as the temperature information of the temperature sensor 850 via the output terminal OUT.

A temperature of the temperature sensor 850 may be seen by using the temperature information output via the output terminal OUT. In Equation 3, the supply voltage VDS and the second resistor R2 have fixed values, and thus VS2 may be used to know RT. When the temperature sensor 850 is implemented as a negative type thermistor having a resistance value RT inversely proportional to temperature, the resistance value RT decreases as the temperature increases. However, when the temperature sensor 850 is implemented as a positive type thermistor having a resistance value RT proportional to temperature, the resistance value RT increases as the temperature increases. Thus, the digital-form voltage VS2 output via the output terminal OUT from the temperature information measuring unit 871-2 may be converted as the temperature of the temperature sensor 850.

Meanwhile, the heater controller 872 serves to control heating of the heater 855.

Hereinafter, an operation of heating the heater 855 at the heater controller 872 will be described as follows.

In order to heat the heater 855, only the switch S7 of FIG. 12 is turned on, and the remaining switches S1 to S6 are turned off, so that the heater 855 may be heated.

The switch controller 873 may generate a switch control signal that turns on or off the seventh switch S7.

The switch controller 873 shown in FIG. 12 turns on/off the switches S1 to S8 for each operation, as shown in Table 1 below.

TABLE 1

|    | OP1 | OP2 |
|----|-----|-----|
| S1 | 1   | 0   |
| S2 | 0   | 1   |
| S3 | 1   | 0   |
| S4 | 0   | 1   |
| S5 | 1   | 0   |
| S6 | 0   | 1   |
| S7 | 0   | 0   |

From Table 1, OP1 shows the switching operation for sensing the temperature of the liquid lens 28 when the current-formed driving signal is applied, and OP2 shows the switching operation for sensing the temperature of the liquid lens 28 when the voltage-formed driving signal is applied. In Table 1, "0" represents that the corresponding switch is turned off, and "1" represents that the corresponding switch is turned on. Hereinafter, a control method of the camera module will be seen as follows with reference to the accompanying drawings. FIG. 15 is a flowchart for describing a control method of a camera module according to an embodiment.

Referring to FIG. 15, first, the temperature of the liquid lens 28 is sensed (S100). The S100 may be performed by the temperature sensor 850. In order to sense the temperature of the liquid lens 28, the switch controller 873 turns off the seventh switch S7, and controls switching operations of the first to sixth switches S1 to S6 so as to measure the temperature information of the temperature sensor 850. Such operations are as described above.

At this time, basically, the temperature sensing operation by the temperature sensor 850 may be performed only in a period in which the switching operation of the lens driver 860 is not performed, that is, in a period in which the switching state of the lens driver 860 is maintained.

After the S100, a difference between the sensed temperature and a predetermined target temperature of the liquid lens 28 is detected (S110). The S110 may be performed by the control unit 870. For example, the S110 may be performed by the switch controller 873.

When there is the difference between the sensed temperature and the predetermined target temperature of the liquid lens 28, the heater 855 is switched to apply power to the heater 855 (S120).

In addition, when there is no difference between the sensed temperature and the predetermined target temperature of the liquid lens 28, the present state is maintained (S130). To this end, the switch controller 873 may generate a switch control signal so as to turn off the seventh switch S7. Therefore, the heater 855 is not heated.

In addition, when the temperature of the liquid lens reaches a target temperature after power is applied to the heater in the S120, the power applied to the heater is shut off to stop the operation of the heater.

Meanwhile, in the embodiment, when the temperature is sensed via the temperature sensor 850, the driving voltage of the liquid lens may be controlled based on the sensed temperature.

In addition, as described above, when the driving voltage of the liquid lens is controlled based on the temperature of the liquid lens, a temperature sensing operation of the liquid lens by the temperature sensor 850 and the control unit 870 may be performed in a period in which the potential of the driving voltage of the liquid lens is not changed.

In the embodiment, the temperature of the liquid lens is sensed in the period in which the switching element of the lens driver that changes the curvature of the interface of the liquid lens is not switched. Accordingly, it is possible to minimize the influence of noise generated by the switching operation of the switching element in the temperature sensing operation, thereby improving accuracy of the temperature sensing.

In addition, in the embodiment, the temperature of the liquid lens is sensed in the period in which the operating state of the heater is not changed. Accordingly, it is possible to minimize the influence of noise generated by changing the operating state of the heater during the temperature sensing operation, thereby improving accuracy of the temperature sensing.

Further, in the embodiment, the switching period of the lens driver used for driving the liquid lens is avoided to operate the heater, and the period in which the operation state of the heater is changed is avoided to perform the temperature sensing operation, thereby improving accuracy of the temperature compensation algorithm.

Meanwhile, a liquid lens control apparatus may include a temperature sensor and a heater, and one of the temperature sensor and the heater may be omitted. For example, the liquid lens control apparatus may be configured to include a liquid lens, a control unit, and a temperature sensor, may be configured to include a liquid lens, a control unit, and a heater, and may be configured to include a liquid lens, a control unit, a temperature sensor, and a heater. When one of the temperature sensor and the heater is omitted, the operation period of the heater described above may be similarly applied to that of the temperature sensor, and conversely, the operation period of the temperature sensor may be similarly applied to that of the heater.

FIG. 16 is a view showing an external appearance of a video display device according to one embodiment of the present invention, and FIG. 17 is a view showing an optical unit and a display of the video display device of FIG. 16 separately.

Referring to the drawings, a video display device 1400 may include a display 1480.

The display 1480 may display an input image, and an optical unit 1495 may be spaced apart from the display 1480 at a predetermined distance, and may be disposed in a user direction. FIG. 16B illustrates separating the distance between the display 1480 and the optical unit 1495.

The optical unit 1495 may be configured to be able to change a traveling direction of light according to the applied power.

For example, the optical unit 1495 may include the liquid lens control circuit including the liquid lens described in the previous drawings.

Accordingly, the traveling direction of the light output from the video display device 1400 may be changed by the varied curvature of the lens, thereby improving visibility when watching a video.

Meanwhile, a method of operating the lens curvature variable device of the present invention may be implemented as a processor-readable code in a recording medium readable by the processor included in the lens curvature variable device. The processor-readable recording medium includes all types of recording devices in which data readable by the processor is stored. Examples of the processor-readable recording medium include a ROM, a RAM, a CD-ROM, a magnetic tape, a floppy disk, an optical data storage system, and the like, and include what is implemented in the form of carrier waves such as transmission through the Internet. Further, the processor-readable recording medium may be distributed to computer systems connected via a network, and the processor-readable code may be stored and executed in a distributed manner.

In addition, preferred embodiments of the present invention are shown and described above, but the present invention is not limited to the specific embodiments described above, of course, various modifications may be made by those skilled in the art to which the invention belongs without departing from the gist of the present invention claimed in the claims, and such modifications should not be individually understood from the technological scope or the prospect of the present invention.

What is claimed is:

1. A liquid lens control apparatus comprising:
   a liquid lens including a first liquid and a second liquid that form an interface with a first electrode and a second electrode;
   a lens driver applying a voltage to the first electrode and the second electrode to control the interface, and including a plurality of switching elements;
   a temperature compensation unit compensating a temperature of the liquid lens; and
   a control unit controlling the lens driver so that the interface forms a target interface, and controlling the temperature compensation unit so that the liquid lens has a target temperature,
   wherein the control unit controls switching states of the plurality of switching elements constituting the lens driver to be maintained during a temperature compensation time at which the temperature compensation unit operates,
   wherein the first electrode includes a common electrode,
   wherein the second electrode includes a plurality of individual electrodes, and
   wherein the temperature compensation time includes a first period between a first rising-edge time at which a voltage applied to the common electrode rises from a ground voltage to a driving voltage and a second rising-edge time at which a voltage applied to the plurality of individual electrodes rises from the ground voltage to the driving voltage.

2. The liquid lens control apparatus of claim 1, wherein the control unit determines a period in which the switching states of the plurality of switching elements are maintained as the temperature compensation time at which the temperature compensation unit operates, and controls the temperature compensation unit to operate during the temperature compensation time.

3. The liquid lens control apparatus of claim 1, wherein the second rising-edge time is a rising-edge time of an individual electrode to which a driving voltage having a smallest time difference as compared with the driving voltage applied to the common electrode is applied among the plurality of individual electrodes.

4. The liquid lens control apparatus of claim 1, wherein the temperature compensation time includes a second period between a second rising-edge time at which the voltage applied to the plurality of individual electrodes rises from the ground voltage to the driving voltage and a first falling-edge time at which the voltage applied to the common electrode drops from the driving voltage to the ground voltage.

5. The liquid lens control apparatus of claim 4, wherein the second rising-edge time is a rising-edge time of an individual electrode to which a driving voltage having a largest time difference as compared with the driving voltage applied to the common electrode is applied among the plurality of individual electrodes.

6. The liquid lens control apparatus of claim 1, wherein the temperature compensation time includes a third period between a first falling-edge time at which the voltage applied to the common electrode drops from the driving voltage to the ground voltage and a second falling-edge time at which the voltage applied to the plurality of individual electrodes drops from the driving voltage to the ground voltage.

7. The liquid lens control apparatus of claim 6, wherein the second falling-edge time is a falling-edge time of an individual electrode to which a driving voltage having a smallest time difference as compared with the driving voltage applied to the common electrode is applied among the plurality of individual electrodes.

8. The liquid lens control apparatus of claim 1, wherein the temperature compensation time includes a fourth period between a second falling-edge time at which the voltage applied to the plurality of individual electrodes drops from the driving voltage to the ground voltage and a third rising-edge time at which the voltage applied to the common electrode rises from the ground voltage to the driving voltage.

9. The liquid lens control apparatus of claim 8, wherein the second falling-edge time is a falling-edge time of an individual electrode to which a driving voltage having a largest time difference as compared with the driving voltage applied to the common electrode is applied among the plurality of individual electrodes.

10. The liquid lens control apparatus of claim 1, wherein the temperature compensation unit includes at least one of:
    a temperature sensor for sensing a temperature of the liquid lens; and
    a heater operating based on the sensed temperature, and
    wherein the temperature compensation time includes at least one of a sensing time at which the temperature sensor is operated and a heating time at which the heater is operated.

11. The liquid lens control apparatus of claim 10, wherein the sensing time and the heating time are overlapped with each other.

12. The liquid lens control apparatus of claim 10, wherein the sensing time and the heating time are periods in which the switching states of the plurality of switching elements that are not overlapped with each other are maintained.

13. The liquid lens control apparatus of claim 11, wherein the heating time includes
an ON change period in which the operation state of the heater is changed to an ON state,
an OFF change period in which the operation state of the heater is changed to an OFF state, and
a heating period between the ON change period and the OFF change period, and
wherein the sensing time is not overlapped with the ON change period and the OFF change period.

14. A liquid lens control apparatus comprising:
a liquid lens including a first electrode and a second electrode;
a lens driver applying a voltage to the first electrode and the second electrode to control an interface of the liquid lens, and including a plurality of switching elements;
a temperature compensation unit compensating a temperature of the liquid lens; and
a control unit controlling the lens driver so that the liquid lens forms a target curvature, and controlling the temperature compensation unit so that the liquid lens has a target temperature,
wherein the control unit determines a period in which switching states of the plurality of switching elements are maintained as a temperature compensation time at which the temperature compensation unit operates, and controls the temperature compensation unit to operate during the temperature compensation time,
wherein the first electrode includes a common electrode, and the second electrode includes a plurality of individual electrodes, and
wherein the temperature compensation time includes a first period between a first rising-edge time at which a voltage applied to the common electrode rises from a ground voltage to a driving voltage and a second rising-edge time at which a voltage applied to the plurality of individual electrodes rises from the ground voltage to the driving voltage.

15. The liquid lens control apparatus of claim 14, wherein the second rising-edge time is a rising-edge time of an individual electrode to which a driving voltage having a smallest time difference as compared with the driving voltage applied to the common electrode is applied among the plurality of individual electrodes.

16. The liquid lens control apparatus of claim 14, wherein the temperature compensation time includes a second period between a second rising-edge time at which the voltage applied to the plurality of individual electrodes rises from the ground voltage to the driving voltage and a first falling-edge time at which the voltage applied to the common electrode drops from the driving voltage to the ground voltage, and
wherein the second rising-edge time is a rising-edge time of an individual electrode to which a driving voltage having a largest time difference as compared with the driving voltage applied to the common electrode is applied among the plurality of individual electrodes.

17. The liquid lens control apparatus of claim 14, wherein the temperature compensation time includes a third period between a first falling-edge time at which the voltage applied to the common electrode drops from the driving voltage to the ground voltage and a second falling-edge time at which the voltage applied to the plurality of individual electrodes drops from the driving voltage to the ground voltage, and
wherein the second falling-edge time is a falling-edge time of an individual electrode to which a driving voltage having a smallest time difference as compared with the driving voltage applied to the common electrode is applied among the plurality of individual electrodes.

18. The liquid lens control apparatus of claim 14, wherein the temperature compensation time includes a fourth period between a second falling-edge time at which the voltage applied to the plurality of individual electrodes rises from the driving voltage to the ground voltage and a third rising-edge time at which the voltage applied to the common electrode rises from the ground voltage to the driving voltage, and
wherein the second falling-edge time is a falling-edge time of an individual electrode to which a driving voltage having a largest time difference as compared with the driving voltage applied to the common electrode is applied among the plurality of individual electrodes.

19. The liquid lens control apparatus of claim 14, wherein the temperature compensation unit includes at least one of:
a temperature sensor for sensing a temperature of the liquid lens; and
a heater operating based on the sensed temperature, and
wherein the temperature compensation time includes at least one of a sensing time at which the temperature sensor is operated and a heating time at which the heater is operated.

* * * * *